US006280642B1

(12) United States Patent
Ikeda et al.

(10) Patent No.: US 6,280,642 B1
(45) Date of Patent: Aug. 28, 2001

(54) INK JET HEAD AND METHOD OF MANUFACTURING SAME

(75) Inventors: Tomoo Ikeda; Etsuo Yamamoto; Yoshimasa Shirai, all of Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/051,267

(22) PCT Filed: Oct. 31, 1996

(86) PCT No.: PCT/JP96/03206

§ 371 Date: Apr. 7, 1998

§ 102(e) Date: Apr. 7, 1998

(87) PCT Pub. No.: WO97/46390

PCT Pub. Date: Dec. 11, 1997

(30) Foreign Application Priority Data

Jun. 4, 1996 (JP) .................................................... 8-141841

(51) Int. Cl.[7] .................................................... G11B 5/127

(52) U.S. Cl. ................................ 216/27; 347/68; 347/69; 347/65; 347/71; 347/85

(58) Field of Search .......................... 216/13, 27; 347/69, 347/68, 65, 71, 85

(56) References Cited

U.S. PATENT DOCUMENTS 4,521,787 * 6/1985 Yokoata et al. ........................ 347/65
5,373,314 * 12/1994 Everett et al. ......................... 347/71
5,477,249 * 12/1995 Hotomi ................................. 347/48
5,477,253 * 12/1995 Hotomi et al. ......................... 347/71
5,508,726 * 4/1996 Sugahara ................................ 347/68
5,657,063 * 8/1997 Takahashi .............................. 347/69
6,074,048 * 6/2000 Hotomi et al. ......................... 347/71

FOREIGN PATENT DOCUMENTS 1-225559 9/1989 (JP) .
4-369546 12/1992 (JP) .

* cited by examiner

*Primary Examiner*—Gregory Mills
*Assistant Examiner*—Rudy Zervigon
(74) *Attorney, Agent, or Firm*—Finnegan, Henderson, Farabow, Garrett & Dunner, L.L.P.

(57) ABSTRACT

An ink jet print head suitable for high-density printing. The ink jet print head comprises a plurality of nozzles for ejecting an ink, ink chambers, for passage and pressurization of the ink, communicating with the nozzles, and pressurizing means for creating a change in volume of the ink in the ink chamber to eject the ink through the nozzles. The ink chamber comprises a base plate member comprised of a transparent substrate having a predetermined form and dimension, a base wall member made of a material impermeable to light, the base wall member being provided above the base plate member in a pattern form according to the form of the ink chamber, and a partitioning member provided, above the base plate member, in areas not occupied by the base wall member. The partitioning member is formed from a partitioning member-forming, photosensitive material by photolithography using the base wall member pattern as a mask. A process of producing the above ink jet head is also disclosed.

4 Claims, 13 Drawing Sheets

(A)

(PRIOR ART)

(B)

(PRIOR ART)

(A)

(B)

(C)

(D)

(E)

(A)

(B)

(C)

(D)

INK JET HEAD AND METHOD OF MANUFACTURING SAME

DESCRIPTION

1. Technical Field

The present invention relates to an ink jet head, and more particularly to an ink jet head particularly suitable for high-density printing and a process for producing the same. The ink jet head of the present invention can be advantageously used in the head section in ink jet printers which have become popular in recent years.

2. Background Art

In recent years, in office automation (OA) equipment, such as word processors, personal computers, and facsimile machines, various measuring instruments, such as medical measuring instruments, and other devices, ink jet printers have been extensively used for printing information at a high density. As is well known in the art, in the ink jet printers, ink droplets are ejected from head sections of the printers and are deposited directly onto a recording medium, such as recording paper, to perform monochrome or color printing. The ink jet printers have many advantages such as printing can be performed on even a three-dimensional recording medium, running cost is low since plain paper can be used as the recording medium, the head can be simply loaded, the step of transfer, fixation and the like is unnecessary, color printing is easily performed, and a sharp color printed image can be provided. The ink jet head can be classified into several types according to the method for ejecting ink droplets from the head. For example, in an ink jet head of a piezoelectric system, a piezoelectric element is used as pressurizing means. In this case, electrostrictive effect provided by this piezoelectric element is utilized to create a pressure wave within an ink chamber, filled with an ink, in the head section, permitting the ink to be ejected through a nozzle in the head section. In an ink jet head of a bubble jet system, a heating element is used as the pressurizing means, and the heating element is heated to form a bubble, permitting an ink to be ejected through a nozzle in the head section. Further, an ink jet head of a static electricity-driven ejection system is also known wherein ink droplets are ejected by utilizing static electricity. The ink jet head according to the present invention can be advantageously applied to ink jet heads of these and other systems.

The conventional ink jet head generally comprises: a plurality of ink chambers which are disposed at equidistant spaces and function as ink flow passages and pressurizing chambers for ejecting ink; and a nozzle plate mounted on the front end of the ink chambers and equipped with nozzles, for ejecting an ink, corresponding to the ink chambers; and pressurizing means for pressurizing ink within the ink chamber in response to the demand for printing. The pressurizing means has a driving element for creating a driving force for pressurizing the ink chamber. The driving element is a piezoelectric element in one case and a heating element in another case.

The structure of the ink jet head will be described in more detail. For example, as can be understood from FIG. 1 showing an exploded view of the ink jet head, an ink jet head 10 of the piezoelectric system comprises several members. An ink chamber member 11 has a plurality of ink chambers 12 which serve as an ink flow passage and as a pressurizing chamber for ejecting an ink. A nozzle plate 13 is mounted on the front end of the ink chamber member 11 and is equipped with nozzles 14, for ejecting an ink, corresponding to the ink chambers 12. As described above, the ink pressurized within the ink chamber 12 can be ejected as droplets through the bore of the nozzle 14. In the ink chamber member 11 shown in the drawing, pressurizing means is mounted on the open face of the ink chamber 12. In the example shown in the drawing, the pressurizing means comprises a diaphragm 15 for creating a change in volume of the ink chamber 12, a piezoelectric element 17 as a driving element for distorting the diaphragm 15, and a base 18 for fixing the piezoelectric element 17.

The ink chamber member 11 has a plurality of ink chambers 12, in a deep groove form, serving both as ink flow passages and as pressurizing chambers for ejecting an ink, and the ink chambers 12 correspond respectively to nozzles 14 formed in the nozzle plate 13 and are designed so that a corresponding nozzle is disposed in one ink chamber. The ink chambers 12 are disposed at equidistant spaces and parallel to one another using a partition for separating adjacent ink chambers from each other. In this case, in order to enhance the resolution of the ink jet head, the spacing between the ink chambers 12 formed in the ink chamber member 11 should be narrowed. The ink chamber member 11 can be generally joined to the nozzle plate 13 with the aid of an adhesive.

The diaphragm 15 is a component characteristic of an ink jet head 10 of a piezoelectric system. When the piezoelectric element 17 is stretched by the electrostrictive effect, the diaphragm 15 is flexed to create a change in volume within the ink chamber 12. A reduction in the volume within the ink chamber 12 causes the ink filled into the chamber to be pressurized, and a part of the ink is ejected as droplets successively through the nozzle 14. The diaphragm 15 generally comprises a sheet having a small thickness of about 3 to 5 $\mu$m and, provided on one side thereof, islands 16 each comprising a protrusion having a height of about 20 $\mu$m. Upon stretching of the piezoelectric element 17 by the electrodistrictive effect, the islands 16 function to surely transmit the distortion created by the stretching to the ink chamber 12. For this reason, the islands 16 are disposed so as to form a laminate together with the respective corresponding ink chambers 12 and the corresponding portions of the piezoelectric element 17. The ink chamber member 11 and the diaphragm 15 can also be joined to each other with the aid of an adhesive.

The piezoelectric elements 17 correspond respectively to the ink chambers 12 in the ink chamber member 11 and are separated from one another in order to avoid influencing other ink chambers 12. The piezoelectric elements 17 separated from one another are fixed onto a base 18. In general, the piezoelectric elements 17 separated from one another are prepared by joining piezoelectric elements, which are not initially in a separated state, to a base with the aid of an adhesive and then selectively separating the piezoelectric elements alone from one another by cutting. After the formation of an integral assembly of the piezoelectric elements and the base, the piezoelectric elements may be joined respectively to corresponding islands, formed on the diaphragm, with the aid of an adhesive.

In the above and other ink jet heads, the performance of the ink chambers serving both as ink flow passages and as pressurizing chambers for ejecting ink directly influences printing properties and hence is very important. At the outset, an ink chamber member constituting the ink chambers will be described. The ink chamber member in the conventional piezoelectric ink jet head has been generally produced by injection-molding an organic material, for example, "Epox" (tradename of an epoxy resin). The ink chamber member constituted by the organic material, however, has poor rigidity, posing problems including that satisfactory pressure cannot be applied to the ink at the time of pressurizing.

Another method for producing the ink chamber member is such that a powder of an oxide, such as $ZrO_2$, is used instead of the organic material and the powder is molded by powder injection molding into an ink chamber member. In this method, however, use of a mold is necessary, and a very large pressure should be applied at the time of filling of the mold with the powder as the raw material, making it difficult to use a mold having a structure fine enough to form fine ink chambers.

Etching also may be mentioned as a method suitable for the formation of fine ink chambers. For example, according to this method, a groove pattern can be finely formed on the surface of a metallic sheet having a thickness of about several hundred gm. In this method however, regarding an increase in density, the minimum possible width of the groove is approximately equal to the sheet thickness, and, hence, the above method cannot be said to be satisfactorily effective. Further, according to the etching method, the metallic sheet can be also etched off during formation of the groove, and therefore, if use of the metallic sheet as the ink chamber member is contemplated, one side of the metallic sheet should be clad with an additional member for preventing etching off of the sheet, rendering the production process complicated.

A further method for forming the ink chamber member is photolithography, using a photosensitive resin generally called “photoresist” or “resist,” which is known from and disclosed in, for example, Japanese Examined Patent Publication (Kokoku) Nos. 62-59672 and 2-42670. This method comprises the steps of: applying a resist onto the whole surface of a substrate on which ink chambers are to be formed; selectively exposing the resist film to suitable light according to a pattern of the ink chamber to be formed; and dissolving and removing areas, not insolubilized by the exposure, by using a developing solution to prepare a substrate provided with desired ink chambers of the pattern of the cured resist. Photolithography uses a resist widely adopted in the production of semiconductor devices such as LSIs and VLSIs.

FIGS. 2(A) and (B) are cross-sectional views showing, in order, the steps for forming ink chambers by the conventional photolithography. As shown in FIG. 2 (A), a resist is coated onto the surface of a substrate 31 to form a resist layer 32 which is then subjected to pattern exposure through a photomask 33. Since the resist used herein is a negative-working resist sensitive to ultraviolet radiation, the photomask 33 is made of glass and constructed so that an ultraviolet radiation is passed through the glass in its areas corresponding to partitions of the ink chambers and a chromium layer is applied to the other areas in order to prevent the passage of the ultraviolet radiation. Light for exposure indicated by an arrow is ultraviolet radiation from a light source (not shown).

As a result of the pattern exposure, the exposed areas in the resist layer 32 are rendered insoluble in a developing solution. The exposed resist layer 32 is developed with a suitable developing solution to dissolve and remove unexposed areas (soluble areas). As shown in FIG. 2(B), a cured resist pattern 32 corresponding to the form of desired ink chambers is provided. The residual resist pattern 32 serves as a partitioning member for separating adjacent ink chambers from each other. The substrate 31 serves as a base plate member. In the photolithography shown in the drawing, a negative-working resist was used as the resist. Use of a positive-working resist, wherein the exposed areas are solubilized and removed by dissolution, instead of the negative-working resist has also been reported.

Ink chambers in an ink jet head of another system, a bubble jet head, can be produced in the same manner as described in connection with the production of the piezoelectric ink jet head. Specifically, ink chambers and nozzles are basically common to head sections in these two systems. In the bubble jet system, however, the piezoelectric element and the diaphragm are not used, and, instead, heating elements and related members disposed so as to correspond respectively to the ink chambers are provided on a highly rigid substrate.

The conventional ink jet heads described above cannot cope with high-density printing which has been desired particularly in recent years.

In recent years, high-density printing of not less than 180 in terms of dots per inch (dpi) is required in the field of printers. In this connection, it is needless to say that, in the ink jet head, the distance between ink chambers and therefore the distance between nozzles should be a small value equivalent to at least 180 dpi. The “spacing equivalent to 180 dpi,” when specifically expressed in terms of length, means that the ink chambers and the nozzles are formed at spacings of 141 $\mu$m (see spacing d between adjacent ink chambers 12 and spacing d between adjacent nozzles 14 in FIG. 1). Specifically, in the ink chamber member, an ink chamber and a partitioning member for separating ink chambers should be formed in a limited length of 141 $\mu$m. For example, when the ratio of the width of the ink chamber to the thickness of the partitioning member is 1:1, the width of the ink chamber and the thickness of the partitioning member are respectively 70.5 $\mu$m and 70.5 $\mu$m. Thus, the width of the ink chamber decreases with increasing the printing density. In this connection, however, it should be noted that, although high-density printing can be achieved by decreasing the width of the ink chamber, excessively small ink dots printed on a recording medium do not offer good print quality. Ensuring a large dot ejected, in other words, ejection of a satisfactory amount of an ink through each nozzle, is necessary for avoiding the deterioration of the print quality. A larger volume of the ink chamber is better for meeting this requirement. This requires the provision of an ink chamber of which the height of the partitioning member is large.

Returning to the formation of the ink chamber member, in the case of injection molding, which is the most commonly used conventional method, the formation of a fine structure equivalent to a printing density of about 120 dpi is the limit of the injection molding because the formation of a fine structure leads to a fear of the mold per se being broken and, in addition, molding cannot be performed with high accuracy.

On the other hand, in the case of the etching method, it is easy to finely fabricate a flat material, and, hence, this method can satisfactorily cope with a patterning of about 180 dpi. In the conventional etching method, however, the possible patterning width is influenced by the thickness of the member to be etched. For example, when the formation of an ink chamber member having a fine structure equivalent to 180 dpi, that is, an ink chamber width of 70.5 $\mu$m and a partitioning member thickness of 70.5 $\mu$m, is contemplated, patterning cannot be carried out unless the thickness of the member to be etched is 70 $\mu$m or less. This means that, when higher density is desired, the height of the ink chamber cannot be increased.

This is true of the formation of ink chambers by photolithography using a resist. Specifically, when the thickness of the resist is 50 μm or more, patterning of the resist layer by the conventional photolithography is impossible. The reason for this is as follows. A photosensitive resin commonly used as a resist is designed on the premise that the thickness is 50 μm or less. In fact, when the photosensitive resin is used in a thickness exceeding 50 μm in the resist process, problems such as underexposure and underdevelopment occurs, making it impossible to achieve fine patterning.

When the resist layer is patterned by the conventional photolithography, the upper limit of the possible patterning width:resist layer thickness ratio (aspect ratio: in the ink chamber member, as will be described below, the aspect ratio being defined by the ink chamber width:ink chamber height ratio) is about 1:2. When the aspect ratio exceeds 1:2, problems occurs including that the resist pattern as the partitioning member of the ink chamber is deformed, or otherwise the base portion close to the substrate is narrowed, resulting in the creation of the so-called "reverse taper" form, or otherwise the pattern can no longer stand up straight and is united with the adjacent pattern.

Regarding the above defect of the resist pattern, reference may be made of a scanning electron photomicrograph (magnification: 500×) shown in FIG. 5. The resist pattern in the photograph is one formed by the present inventors. Specifically, in the formation of the resist pattern, a negative-working thick layer resist (THB 30 (tradename) sensitive to an ultraviolet radiation, manufactured by Japan Synthetic Rubber Co., Ltd.) was provided, and patterning was carried out on an aluminum substrate so that the resist pattern width was 30 μm, the resist pattern spacing was 30 μm, and the resist pattern height was 50 μm. Conditions applied were as follows.

Coating of resist: 1000 rpm×10 sec; Prebaking: 100° C., 5 min; Exposure conditions: 100 $mW/cm^2$, 35 sec; Post-baking: 100° C., 15 min.

As can be seen from the photograph shown in FIG. 5, when the aspect ratio of the resist pattern was 1: about 1.7, the formed pattern was satisfactory, that is, a defect-free resist pattern wherein cured partitions were orderly arranged.

Further, the formation of a resist pattern was repeated in the same manner as described above, except that the aspect ratio was gradually increased. As a result, a defect began to occur when the height of the resist pattern was around 60 μm.

FIG. 3 illustrates an example where the resist pattern 32 formed on an aluminum substrate 31 is in a reverse taper form. As is apparent from the drawing, the resist pattern 32 is formed such that its side wall is not perpendicular to the substrate 31, and thus the width of the partition is narrow at the base 32*a*. This reverse tapered pattern is attributed to the fact that, at the time of exposure, a satisfactory amount of light does not reach the base 32*a* in contact with the substrate 31 and, consequently, the exposure in the thicknesswise direction of the resist layer 32 becomes heterogeneous. That is, since the thickness layer resist is a negative-working resist wherein unexposed areas are dissolved and removed by development, the portion, around the base 32*a* of the resist layer 32, which is less likely to be exposed is overdeveloped. This tendency becomes significant with increasing the thickness of the resist layer. When the resist pattern to be used as the partitioning member of the ink chamber member is in such a reverse taper form, the area, which participates in intimate contact between the substrate 31 and the resist pattern 32, is reduced and, in the worst case, the resist pattern 32 is separated from the substrate 31. Even though the resist pattern 32 is not separated from the substrate 31, since the wall thickness of the pattern decreases with an increase in the aspect ratio of the resist pattern 32, the resist pattern 32 often falls particularly in the thin portion as shown, for example, in FIG. 4 as a cross-sectional view. Deformation of the resist pattern in this way makes it impossible to use the resist pattern as partitioning members in the ink chambers.

FIG. 6 is a scanning electron photomicrograph (magnification: 350×) showing an example where a resist pattern is formed in a reverse taper form on an aluminum substrate and walls of the pattern in their apex are partially united with each other. The resist pattern shown in this photograph was formed substantially the same manner as described above in connection with FIG. 5, except that, for comparison, the width of the resist pattern, the spacing between walls of the pattern, and the height of the pattern were 50 μm, 50 μm, and 100 μm, respectively, and the resist solution was coated twice to increase the layer thickness.

From the above results, it is apparent that, when the resists used above and other commercially available resists are used to form a resist pattern by the conventional method, the aspect ratio of the resist pattern should be limited to until about 1:2 in order to avoid the creation of various defects.

DISCLOSURE OF THE INVENTION

The present invention solves the above many problems of the conventional ink jet heads. Accordingly, an object of the present invention is to provide an ink jet head which can be advantageously used in high-density printing, can be applied to various systems, such as piezoelectric and bubble jet systems and can be easily produced with high accuracy and in good yield.

Another object of the present invention is to provide a process for producing the above ink jet head.

According to one aspect of the present invention, there is provided an ink jet head comprising a plurality of nozzles for ejecting an ink, ink chambers, for passage and pressurization of the ink, communicating with the nozzles, and pressurizing means for creating a change in volume of the ink in the ink chamber to eject the ink through the nozzles, the ink chamber comprising a base plate member comprised of a transparent substrate having predetermined form and dimension, a base wall member made of a material impermeable to light, the base wall member being provided above the base plate member in a pattern form according to the form of the ink chambers, and a partitioning member provided, above the base plate member, in areas not occupied by the base wall member, the partitioning member having been formed by a process comprising the steps of;

coating a partitioning member-forming photosensitive material in a predetermined thickness on the substrate in its whole area of the side where the base wall member has been provided;

selectively exposing the photosensitive material coating through the base wall member pattern to light to which, when the light is applied through the backside of the substrate, the photosensitive material is sensitive, thereby rendering exposed areas of the photosensitive material coating insoluble in a developing solution; and developing the exposed photosensitive material coating to remove unexposed areas.

According to another aspect of the present invention, there is provided a process for producing an ink jet head comprising a plurality of nozzles for ejecting an ink, ink chambers, for flow and pressurization of the ink, communicating with the nozzles, and pressurizing means for creating a change in volume of the ink in the ink chamber to eject the ink through the nozzles, the ink chamber being produced by a process comprising the steps of:

providing a transparent substrate having predetermined form and dimension to form a base plate member;

forming a pattern of a base wall member made of a light-impermeable material on the surface of the substrate;

coating a partitioning member-forming photosensitive material in a predetermined thickness on the substrate in its whole area of the side where the base wall member has been provided;

selectively exposing the photosensitive material coating through the base wall member pattern to light to which, when the light is applied through the backside of the substrate, the photosensitive material is sensitive, thereby rendering exposed areas of the photosensitive material coating insoluble in a developing solution; and developing the exposed photosensitive material coating to remove unexposed areas of the photosensitive material coating, thereby forming the partitioning member, and thus producing an ink chamber comprising a base plate member, a base wall member provided above the base plate member in a pattern form according to the form of the ink chambers, and a partitioning member provided, above the base plate member, in areas not occupied by the base wall member.

Other aspects of the present invention can be easily understood from the following detailed description.

According to the present invention, since the width of the ink chamber can be reduced, high-density printing, which has been desired in the art, is possible. In addition, according to the present invention, the aspect ratio defined as the ink chamber width:ink chamber height ratio may be high. Therefore, as described above, even when the width of the ink chamber is small, the amount of the ink filled into the ink chamber is equal to or larger than that in the conventional ink chamber, so that, every time printing is performed, an ink in a satisfactory amount to such an extent that the print quality is not deteriorated can be ejected through an attached nozzle. Further, the ink jet head of the present invention can be advantageously applied to heads in various systems in the same way.

BEST MODE FOR CARRYING OUT THE INVENTION

The ink jet head according to the present invention, as will be described below, may be of a piezoelectric system, a bubble jet system, or, if desired, another conventional system. These ink jet heads have a fundamental structure comprising a plurality of nozzles for ejecting an ink, ink chambers, for passage and pressurization of the ink, communicating with the nozzles, and pressurizing means for creating a change in volume of the ink in the ink chamber to eject the ink through the nozzles. In this case, the pressurizing means may have various constructions according to the system of the head of the present invention. For example, in the case of a piezoelectric ink jet head, the pressurizing means may comprise a piezoelectric element and related members, for example, a diaphragm. The typical structure of the piezoelectric ink jet head has been already described above with reference to FIG. 1. In the case of the ink jet head of a bubble jet system, the pressurizing means may comprise a heating element and related members, for example, an electrode electrically connected to the heating element.

Figure 7:
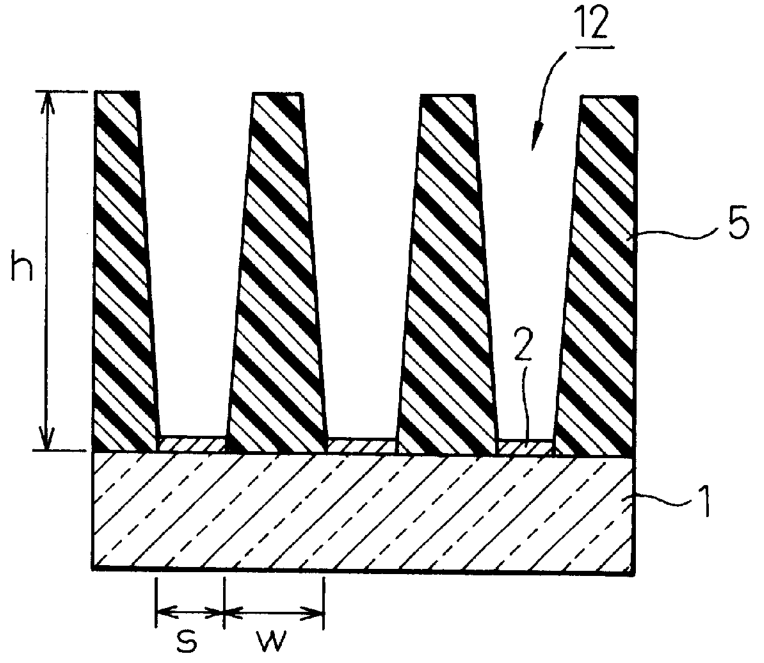
FIG. 7 is a cross-sectional view showing a preferred embodiment of ink chambers formed according to the present invention.

For the ink jet head according to the present invention, the structure and form of ink chambers included therein are important. As shown in FIG. 7 (a partly enlarged view), the ink chamber comprises a base plate member 1 comprised of a transparent substrate having predetermined form and dimension, a base wall member 2 made of a material impermeable to light, the base wall member 2 being provided above the base plate member 1 in a pattern form according to the form of the ink chambers, and a partitioning member 5 provided, above the base plate member 1, in areas not occupied by the base wall member 2. The partitioning member 5 has a width of w and a height of h, and the spacing between the partitioning members 5 disposed at equidistant spaces for constituting the ink chamber 12 is s. Accordingly, the "aspect ratio," often referred to in the present specification and defined as the ink chamber width ink chamber height ratio, is s: h.

The transparent substrate constituting the base plate member 1 is not particularly limited so far as light for pattering passes therethrough at the time of formation of the partitioning member 5 and, in addition, when the base wall member 2 is formed by etching, the substrate per se is neither damaged nor separated by the etching.

Suitable transparent substrate materials include, for example, glass, plastic materials, for example, polyester resins (such as PET) and acrylic resins (such as PMMA), quartz and the like. These materials may be used in the form of a single layer or alternatively in the form of a laminate of two or more layers.

The base wall member 2 made of a light-impermeable member may be formed directly or through an optional intermediate layer (not shown) on the base plate member 1. The light-impermeable material used herein is not particularly limited so far as it can inhibit passage of patterning light at the time of formation of the partitioning member 5 and, in addition, during use of the head, can ensure a good ink flow. However, metallic materials, for example, chromium, tantalum, nickel, titanium, copper, and aluminum, are preferred from the viewpoints of easy formation of the base wall member, accuracy of the pattern and the like. The base wall member 2 may be formed as a single layer or as a laminate of two or more layers from these materials. If necessary, the light-impermeable material may be used in combination with an antireflection layer to form a laminate. Preferably, the base wall member 2 is formed as thinly as possible from the above material. The thickness of the base wall member 2 is generally about 0.05 to 1 μm.

The partitioning member 5, which, together with the base wall member 2, is used to constitute the ink chamber 12, may be formed by a process, as a feature of the present invention, comprising the steps of:

- coating a partitioning member-forming photosensitive material in a predetermined thickness on the transparent substrate 1 in its whole area of the side where the base wall member 2 has been provided;
- selectively exposing the photosensitive material coating through the light-impermeable base wall member 2 pattern to light to which, when the light is applied through the backside of the substrate 1, the photosensitive material is sensitive, thereby rendering exposed areas of the photosensitive material coating insoluble in a developing solution; and
- developing the exposed photosensitive material coating to remove unexposed areas. This process will be described below in more detail in connection with the production of the ink jet head according to the present invention.

The partitioning member-forming photosensitive material may be suitably selected from a number of resists commonly used in a resist process. The resist generally used herein is a negative-working resist. Preferably, a suitable resist is one which enables a layer having a thickness of at least 50 μm to be formed and patterned. For example, THB-30 (tradename) manufactured by Japan Synthetic Rubber Co., Ltd. or OMR-83 (tradename) manufactured by Tokyo Ohka Kogyo Co., Ltd. may be mentioned as one example of this type of resist. If necessary, the partitioning member 5 may be formed from a resist layer having a multi-layer structure of two or more layers in order to utilize the properties of the resists.

The ink chamber member shown in FIG. 7 has the simplest construction. In the ink chamber member according to the present invention, however, in order to avoid the occurrence of an unfavorable diffraction phenomenon, an intermediate layer having a larger thickness than the pattern of the base wall member 2 may be interposed between the base wall member 2 and the partitioning member 5 when the partitioning member 5 is disposed on the base plate member 1 so as to adjoin the base wall member 2. The intermediate layer may be formed by any method from a material suitable for the formation of the partitioning member 5. Suitable materials for the intermediate layer include, for example, epoxy resin and other resin materials, SiN, $SiO_2$, and $TiO_2$. The thickness of the intermediate layer may widely vary. In general, however, it is preferably not less than 5 μm. When the purpose of using the intermediate layer is to avoid the diffraction phenomenon created in a high aspect ratio, a layer thickness below 5 μm could not solve the diffraction problem. The intermediate layer may be formed by spray coating, roll coating, brush coating, thermocompression bonding, vapor deposition, and sputtering or other methods.

Figure 3:
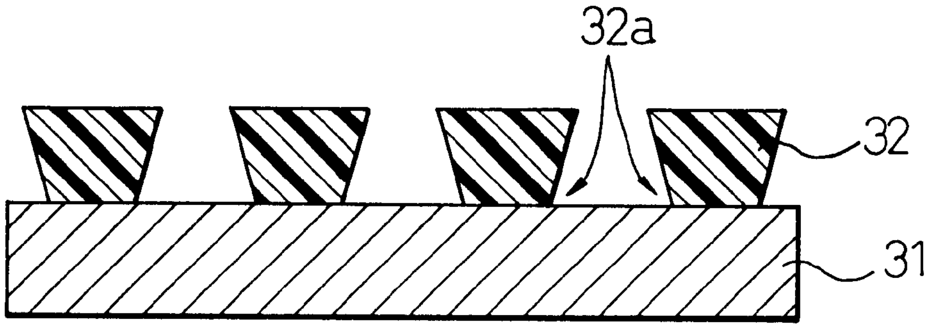
Fig.3 (PRIOR ART)
FIG. 3 is a cross-sectional view showing an example of a defect created in the formation of ink chambers by photolithography.
Figure 4:
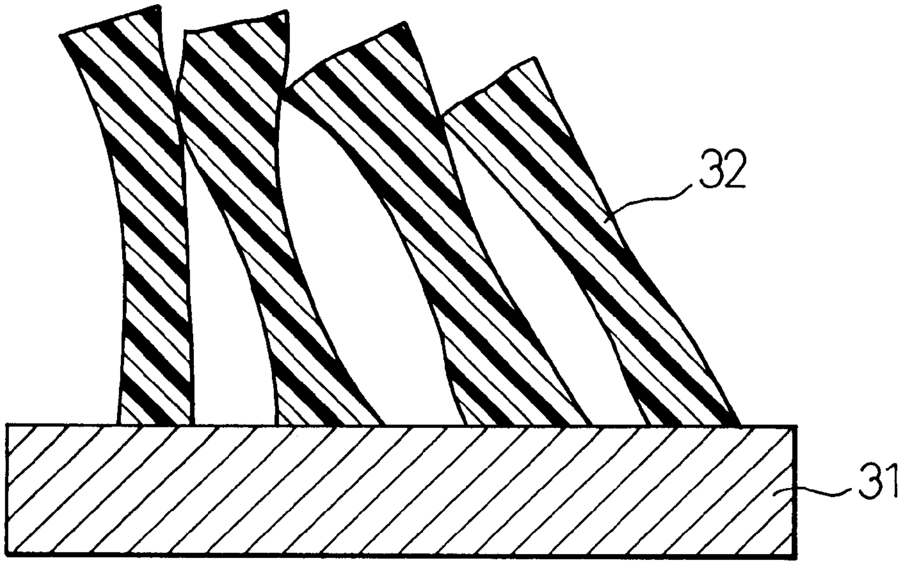
Fig.4 (PRIOR ART)
FIG. 4 is a cross-sectional view showing another example of a defect created in the formation of ink chambers by photolithography.
Figure 5:
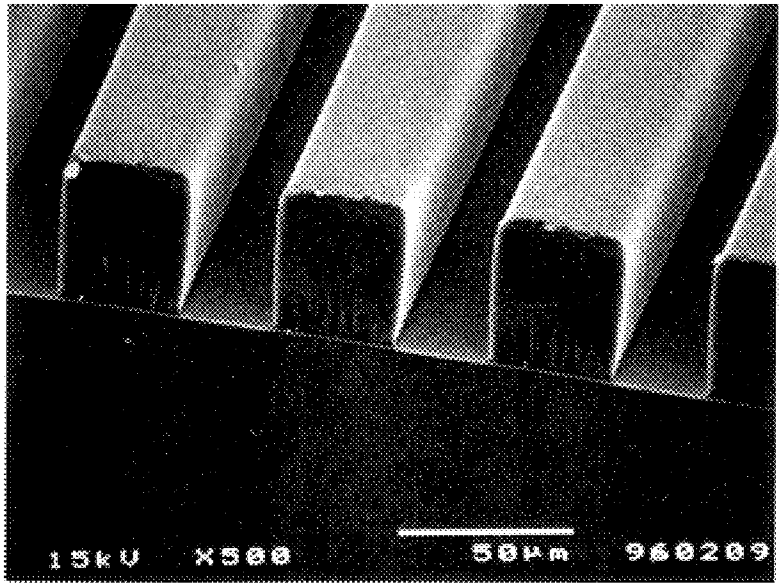
Fig.5 (PRIOR ART)
FIG. 5 is a scanning photomicrograph (magnification: 500×) showing an example of the ink chambers formed by photolithography.
Figure 6:
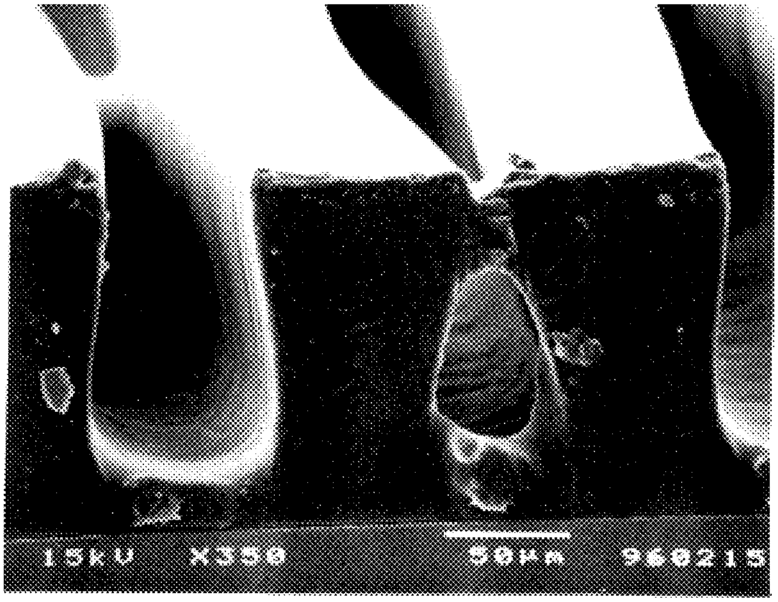
Fig.6 (PRIOR ART)
FIG. 6 is a scanning photomicrograph (magnification: 350×) showing another example of the ink chambers formed by photolithography.

In the ink chamber member according to the present invention, preferably, the ink flow passage of the ink chamber has, as viewed with respect to the section in the vertical direction, a rectangular section longer in the vertical direction, the ink chamber having a height of at least 50 μm and an aspect ratio, defined as the ink chamber width:ink chamber height ratio, i.e., s:h, of 1:3 or more. In particular, the wall surface of the ink flow passage, that is, the wall surface of the partitioning member, does not stand perpendicularly on the surface of the substrate but has a noticeable inclination. When this is examined in terms of the form of the partitioning member, the partitioning member is tapered from the lower part, close to the substrate, toward the upper part, that is, in a taper form opposite to the reverse taper form of the partitioning member, of the conventional ink chamber, described above with reference to FIG. 3. In the present specification, this form of the partitioning member tapered from the lower part toward the upper part is expressly called a "forward taper" form. As described below in detail, the reason why the forward tapered partitioning member is formed is that, in the patterning method adopted in the present invention, the amount of light received by the thick layer resist in its lower portion, that is, a portion closer to the substrate, is larger than the amount of light received by the upper portion. The partitioning member of the present invention, by virtue of the forward taper form, can be stably fixed and positioned onto the substrate as the base plate member. Further, separation of the partitioning member from the substrate and collapse the partitioning member during use can be significantly prevented. Consequently, patterning of a resist layer having a thickness of 100 μm or more to form ink chambers having desired form and dimension, which has been considered impossible in the prior art, has now become possible.

Figure 9:
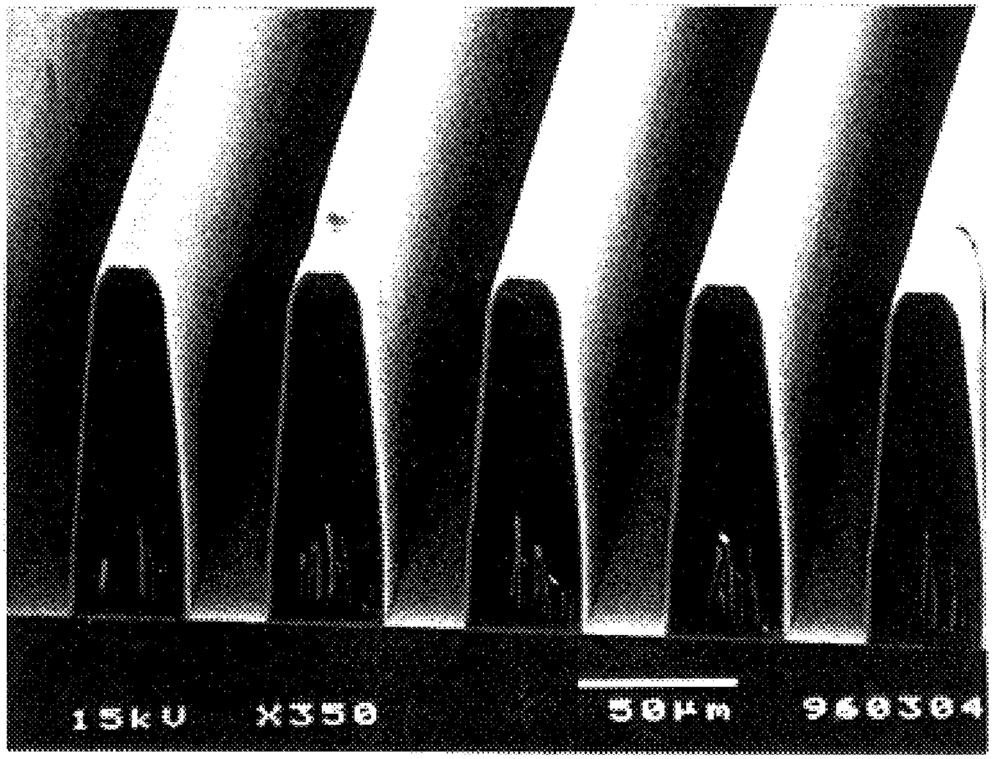
FIG. 9 is a scanning photomicrograph (magnification: 350×) showing an embodiment of ink chambers formed according to the present invention.

The formation of ink chambers having a high aspect ratio of 1:3 or more is apparent from a scanning electron photomicrograph (magnification: 350×) shown in FIG. 9. The resist pattern shown in the photograph is one formed by the present inventors. Specifically, in the formation of the resist pattern, a negative-working thick layer resist (THB 30 (tradename) sensitive to an ultraviolet radiation, manufactured by Japan Synthetic Rubber Co., Ltd.) was provided, and patterning was carried out on a glass substrate, according to the process of the present invention described below in detail, so that the resist pattern width was 41 μm, the resist pattern spacing was 30 μm and the resist pattern height was 100 μm. A chromium pattern having a width of 30 μm, which has been used as a mask, is very thin and hence does not appear in the photograph. Major conditions applied were as follows.

Coating of resist: 1000 rpm×10 sec (double coating); Prebaking: 100° C., 5 min;

Exposure conditions: 10 mW/cm$^2$, 45 sec (back exposure from the glass substrate side);

Post-baking: 100° C., 15 min.

As can be seen from the microphotograph shown in FIG. 9, even when the aspect ratio of the resist pattern is 1: about 3.3, the resultant pattern was satisfactory, that is, a defect-free, long and narrow resist pattern wherein cured partitions were properly arranged. Since the resist pattern has satisfactory height, a large amount of ink can be held in the ink chamber, offering good print quality.

In the formation of the above resist pattern having a high aspect ratio, increasing the thickness of the resist is likely to result in more significant underexposure near the surface of the resist layer and a more unclear boundary between the exposed area and the unexposed area. In the present invention, however, in the development, fresher developing solution is fed to a portion closer to the surface of the resist layer after the exposure. Therefore, even though the boundary between the exposed area and the unexposed area is somewhat unclear, the development can be carried out to a satisfactory extent. Thus, in the present invention, even when the thickness of the resist layer is significantly increased, a finer resist pattern than that attained by the prior art method can be formed.

In the production of the ink jet head according to the present invention, the ink chamber can be advantageously produced through the following series of steps:

- providing a transparent substrate having predetermined form and dimension to form a base plate member;
- forming a pattern of a base wall member made of a light-impermeable material on the surface of the substrate;
- coating a partitioning member-forming photosensitive material in a predetermined thickness on the substrate in its whole area of the side where the base wall member has been provided;
- selectively exposing the photosensitive material coating through the base wall member pattern to light to which, when the light is applied through the backside of the substrate, the photosensitive material is sensitive, thereby rendering exposed areas of the photosensitive material coating insoluble in a developing solution; and
- developing the exposed photosensitive material coating to remove unexposed areas of the photosensitive material coating, thereby forming the partitioning member. Each of the above steps will be described. Formation of base plate member:

A transparent substrate having a predetermined form and dimensions is provided to form a base plate member. Suitable transparent substrates usable herein include those described above in connection with the construction of the ink chamber. The substrate used may be subjected to surface treatment by a conventional method for enhancing the adhesion between the substrate to the base wall member and the partitioning member and for other purposes.

Formation of patterned base wall member:

In order to form the bottom of the ink chamber, a base wall member is formed in a pattern form using a light-impermeable material on the surface of the substrate. As specifically described above, various metallic materials may be advantageously used as the light-impermeable material for the base wall member. The base wall member may be formed directly on the substrate by applying the selected base wall member-forming material in a pattern form onto the substrate. Alternatively, the base wall member-forming material may be applied onto the substrate in its whole area followed by selective removal of unnecessary areas alone to form the base wall member.

Preferably, the base wall member is formed by the latter process. More preferably, it may be formed by a process comprising the steps of:

- coating a base wall member-forming material on the substrate in its whole surface area;
- coating a photosensitive material on the whole area of the base wall member-forming material coating;
- selectively removing the photosensitive material coating according to a desired base wall member pattern by photolithography; and
- using the photosensitive material pattern as a mask to selectively remove the underlying base wall member-forming material coating by photolithography. A desired patterned base wall member can be formed through the above series of steps.

In this case, as described above, the coating of the base wall-forming material as an opaque layer, which is first formed on the substrate, is preferably a coating of a metallic material. The coating may be formed by any method known in the art. Suitable methods include, but are not limited to, the following methods 1. PVD (physical vapor deposition):
   sputtering, vacuum deposition, ion plating and the like.
2. CVD (chemical vapor deposition):
   thermal CVD (under atmospheric pressure or reduced pressure), plasma CVD, MO-CVD and the like.
3. Electroless plating
4. Coating:
   spin coating, spray coating, dip coating, roll coating, brush coating and the like.

After the base wall member-forming material coating is formed, a photosensitive material to be used as a mask in the selective removal of the base wall member, that is, a resist, is coated thereon. The resist used herein is not particularly limited. However, a resist is preferred which, when coated to a layer thickness of 10 μm or less in order to increase the accuracy of the pattern, can form a desired resist pattern. The resist for patterning may be either a positive-working resist or a negative-working resist. Suitable resists include, for example, AZ-4620 (tradename) manufactured by Hoechst, OFPR-8000 and OMR-83 (tradenames) manufactured by Tokyo Ohka Kogyo Co., Ltd., and Riston (tradename) manufactured by E. I. du Pont de Nemours & Co. The selected resist is coated to a predetermined thickness by a conventional method, for example, spin coating, dip coating, spray coating, roll coating, or brush coating, and the coating is then dried.

Subsequently, the resist layer thus formed is selectively removed according to the desired pattern of the base wall member by photolithography. The photolithography used herein may be carried out in such a manner as commonly adopted in the resist process. For example, exposure of the resist layer may be carried out by using the following methods and other methods depending upon the type of the resist and the like:

1. ultraviolet radiation exposure: contact exposure, proximity exposure, projection exposure and the like;
2. X-ray exposure; and
3. electron beam exposure.

The photomask is varied depending upon the exposure method used, and the mask pattern is also varied depending upon the type of the resist. The development following the exposure may also be carried out in any manner commonly adopted in the resist process.

After the formation of the resist pattern, the underlying base wall member-forming material coating is selectively removed using the pattern as a mask. The selective removal of the coating may be carried out by methods commonly used in the production process of semiconductor devices and the like, and examples of suitable methods usable herein include, for example, etching, for example, 1. wet etching:
   dipping, showering and the like; and
2. dry etching:
   RIE (reactive ion etching), ICP, ECR, ion beam etching and the like, and lifting-off (patterning followed by the formation of a base wall member-forming material layer). Thus, a desired bottom wall member is provided in a pattern form.

Formation of partitioning member:

After the formation of the base wall member having a desired pattern, the formation of a partitioning member for separating adjacent ink chambers from each other is carried out as the final step.

At the outset, a partitioning member-forming photosensitive material is coated to a desired thickness onto the whole area of the substrate in its side with the base wall member formed thereon by the previous step. The photosensitive material used herein, that is, the resist, is not particularly limited. However, a resist which can be coated to a thickness of at least 50 $\mu$m is preferred from the viewpoint of forming a thicker partitioning member to increase the aspect ratio of the ink chamber. Further, the resist should be such that unexposed areas are dissolved and removed by a developing solution. That is, the resist is the so-called "negative-working resist." In order to increase the layer thickness, the negative-working resist may be a laminate of two or more resist layers. Suitable negative-working resists include, for example, THB-30 (tradename) manufactured by Japan Synthetic Rubber Co., Ltd. and OMR-83 (tradename) manufactured by Tokyo Ohka Kogyo Co., Ltd. The selected resist is coated to a predetermined thickness by a conventional method, for example, spin coating, dip coating, spray coating, roll coating, or brush coating, and the coating is then dried. The thickness of the partitioning member-forming resist layer thus formed is preferably at least 50 $\mu$m, generally 50 to 200 $\mu$m or more.

Subsequently, the resist layer thus formed is selectively removed by photolithography to form a partitioning member. The photolithography used herein may be carried out in the same manner as used in the step of forming the base wall member, and, for example, the exposure may be carried out by ultraviolet exposure, X-ray exposure or the like according to the photosensitivity of the resist used. In the step of exposure, it is important to conduct exposure from the backside of the transparent substrate. Specifically, the formed resist layer is selectively exposed from the backside of the substrate without any special photomask, provided that the patterned base wall member impermeable to light is used as the mask. The exposure from the backside of the transparent substrate is generally called "back exposure." As a result of the exposure using, as a light source for exposure, light to which the resist is sensitive, exposed areas in the resist layer, that is, areas where there is no inhibition of passage of the light by the base wall member as the mask, are rendered insoluble in a developing solution.

After the completion of the exposure, unexposed areas (soluble areas) in the resist layer are dissolved in and removed by a developing solution. The step of development may be carried out in the same manner as commonly adopted in the resist process. For example, the developing solution and the developing time may be suitably selected according to the type of the resist used. For example, when the resist is THB-30 (noted above), a special developing solution for THB-30, commercially available from Japan Synthetic Rubber Co., Ltd., may be used in the development of the exposed resist layer. As a result of the development, a desired partitioning member is provided. As described above, the sectional form of the partitioning member is a forward tapered one.

Figure 15:
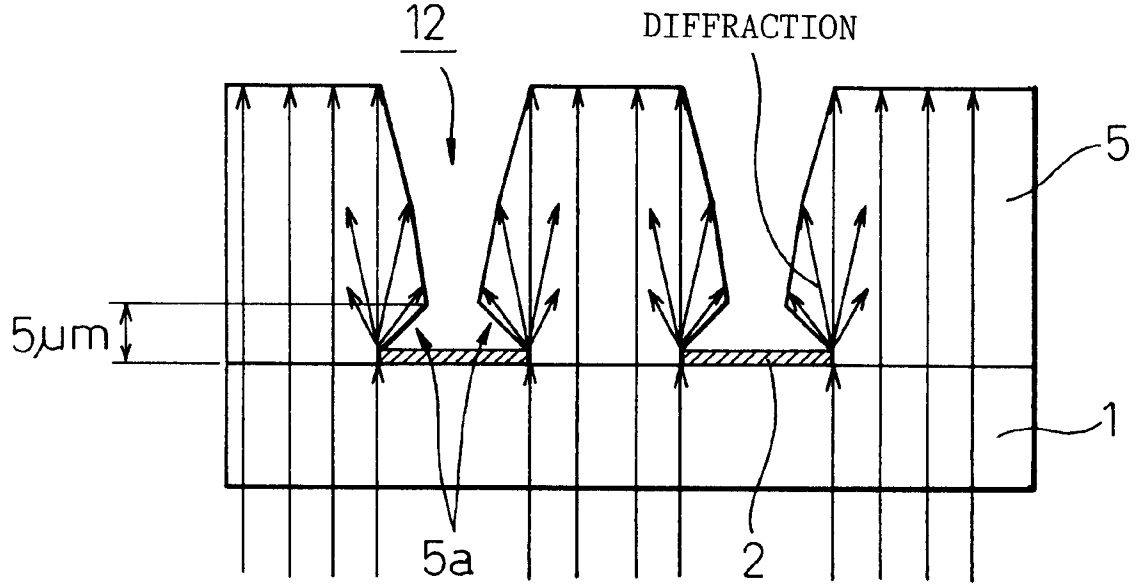
FIG. 15 is a cross-sectional view illustrating the diffraction of light, in the vicinity of the bottom of ink chambers, experienced in the formation of an ink chamber member according to the present invention.

According to the process of the present invention, as described above, a long and narrow, forward tapered partitioning member can be formed, and, consequently, the aspect ratio of the ink chamber can be brought to 1:3 or more. According to finding by the present inventions, when the height of the partitioning member is increased in order to enhance the aspect ratio, for example, when the aspect ratio is brought to 1:5 or more, in other words, when the height of the ink chamber is 150 $\mu$m or more with the width of the ink chamber being 30 $\mu$m, a "cut-in" defect (as a function of the unetched side wall of the partitioning member) often occurs in the base of the partitioning member due to light diffraction at the time of exposure. The cut-in in the partitioning member does not adversely affect the self-supporting property of the partitioning member per se. Preferably, however, the cut-in should be prevented because it reduces the volume of the ink chamber. The diffraction phenomenon will be explained with reference to FIG. 15 wherein, for convenience of explanation, the state after the formation of the partitioning member is shown.

In the step of forming the partitioning member, when a partitioning member-forming resist layer 5 is selectively back-exposed through a base wall member 2 as a mask, excessively large exposure results in the creation of light diffraction, as indicated by an arrow in the drawing, at an edge of the base wall member 2. A part of light for exposure enters the backside of the base wall member 2, and, consequently, this exposed area is also cured. Therefore, as shown in the drawing, the development of the resist layer 5 after the exposure results in the creation of cut-in 5*a* of the member in the base of the partitioning member 5. In general, a larger thickness of the resist layer 5 requires a larger exposure. For this reason, it is preferred to simultaneously achieve increased resist layer thickness and the prevention of the above undesired light diffraction.

According to one preferred embodiment of the present invention, the process of the present invention further comprises, after the step of forming a base wall member pattern and before the step of coating a partitioning member-forming resist thereon, the step of forming an intermediate layer so as to cover the already formed base wall material pattern, that is, forming an intermediate layer, of a material permeable to light for exposure of the partitioning member-forming resist, in a larger thickness than that of the base wall member pattern.

By virtue of the provision of the intermediate layer on the base wall member pattern, even though light diffraction occurs, the diffraction is limited to within the unreactive intermediate layer and does not reach the partitioning-forming resist layer. Thus, a partitioning member free from a defect such as cut-in in the base can be obtained.

The material used in the formation of the intermediate layer is not particularly limited so far as it is permeable to light for exposure of the partitioning member-forming resist. Suitable materials for the intermediate layer include, but are not limited to, epoxy resin and other resin materials, SiN, $SiO_2$, and $TiO_2$. If necessary, the partitioning member-forming resist may be used as the material for the intermediate layer. The above material for the intermediate layer may be coated by a conventional method, for example, spray coating, roll coating, brush coating, thermocompression bonding, vapor deposition, and sputtering or other methods, to a desired thickness. The thickness of the intermediate layer is generally not less than 5 μm, preferably 5 to 50 μm. When the layer thickness is less than 5 μm, the light diffraction cannot be absorbed within the intermediate layer. On the other hand, a layer thickness exceeding 50 μm often adversely affects the self-supporting properties of the partitioning member on the intermediate layer.

The ink chamber member may, as such, be used in the production of an ink jet head. Otherwise, if necessary, the ink chamber member thus produced may be used as a mold, for electrocasting, to form an ink chamber member of a metallic material by electrocasting. The metallic ink chamber member formed by the electrocasting is advantageous in that, in particular, partitions having high rigidity can be formed making it possible to further narrow the spacing between partitions.

The electrocasting may be carried out by a conventional method. For example, an electrode layer for electrocasting is coated on the whole surface of an ink chamber member, provided with a partitioning member of a resist layer, to be used as a mold. Suitable materials for the electrode layer include conductive metallic materials, for example, gold, copper, nickel, silver, platinum, and tungsten. In this case, addition of a metal such as chromium is preferred from the viewpoint of enhancing the adhesion to the ink chamber member as the substrate. The electrode layer may be coated by vapor deposition, sputtering, electroless plating and the like. After the formation of the electrode layer, electrocasting is carried out. Electrocasting materials which may be advantageously used here include, for example, metals, such as nickel and copper, and alloys thereof. For example, electrocasting using nickel may be carried out under the following conditions. Composition of electrocasting bath:

| | |
|---|---|
| water | 5 L (liters) |
| nickel sulfamate | 1650 g |
| nickel chloride | 150 g |
| boric acid | 225 g |
| sodium laurylsulfuric acid | 5 g |

Bath temp.: 60° C.±1° C.; Current density: 50 $mA/cm^2$; Stirring rate: 1 L/min.

Demolding subsequent to the electrocasting using the above bath provides a nickel ink chamber member having thereon a thin electrode layer. The form and the dimension of the ink chamber member correspond to those of the ink chamber member used as the mold.

Figure 1:
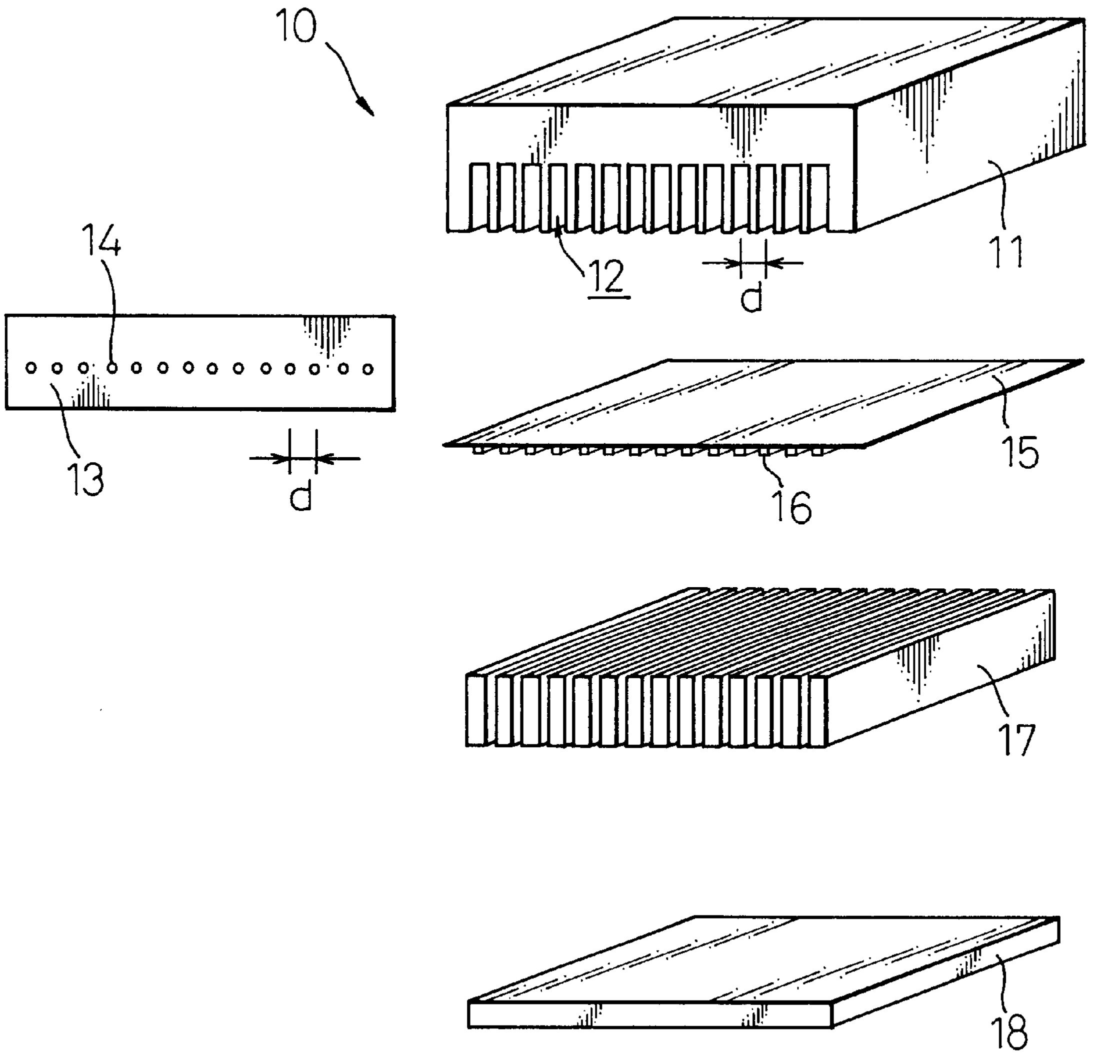
Fig.1 (PRIOR ART)
FIG. 1 is an exploded view showing the construction of a conventional piezoelectric ink jet head.
Figure 2:
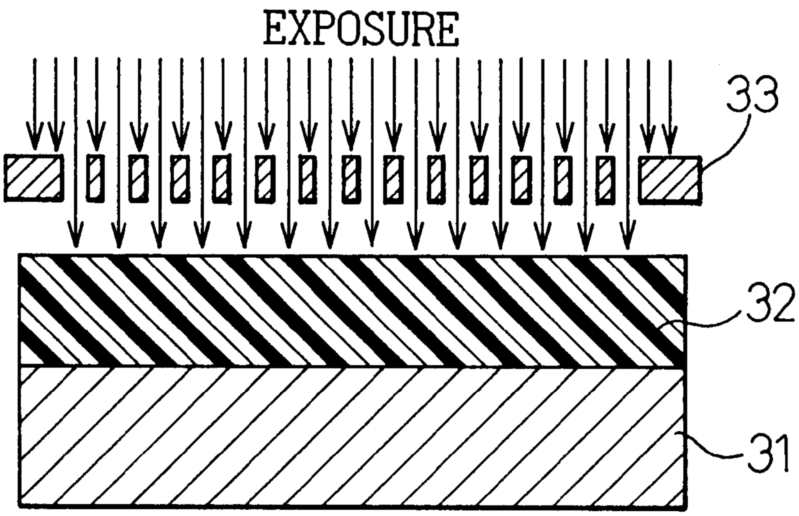
FIGS. 2(A) and (B) are cross-sectional views showing, in order of steps, the formation of ink chambers by conventional photolithography.
Figure 2:
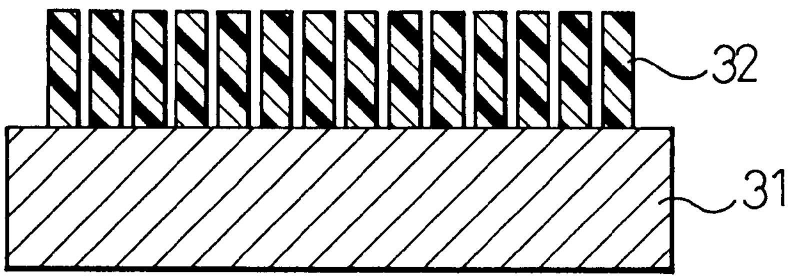
Figure 8:
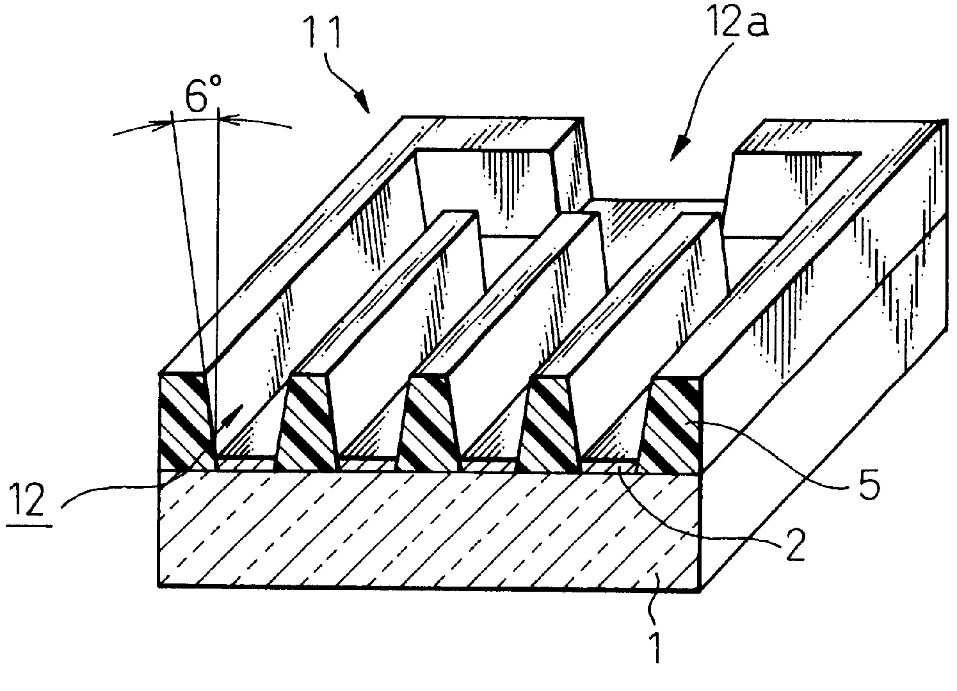
FIG. 8 is a perspective view showing a preferred embodiment of an ink chamber member provided with ink chambers formed according to the present invention.

As described above, the ink jet head according to the present invention can be advantageously applied to ink jet heads of piezoelectric, bubble jet, and other systems. For example, the piezoelectric ink jet head may be produced by disposing pressurizing means, including a piezoelectric element and the like, on the ceiling section of the ink chamber member formed above. For example, when the ink chamber member takes a form, as shown in FIG. 8 and prepared in Example 1 described below, that is, when the ink chamber 12 comprises a base plate member 1, a base wall member 2, and a partitioning member 5, a desired piezoelectric ink jet head can be provided by incorporating the ink chamber member into an ink jet head, for example, as shown in FIG. 1, so that the ink chamber faces downward.

The bubble jet ink jet head may be produced by providing as the pressurizing means a heating element and an electrode electrically connected to the heating element and forming the pressurizing means on the base wall member in the course of the formation of the ink chamber member. The provision of the pressurizing means on the base wall member may be carried out by various methods utilizing techniques commonly used in the production of bubble jet heads.

Figure 14:
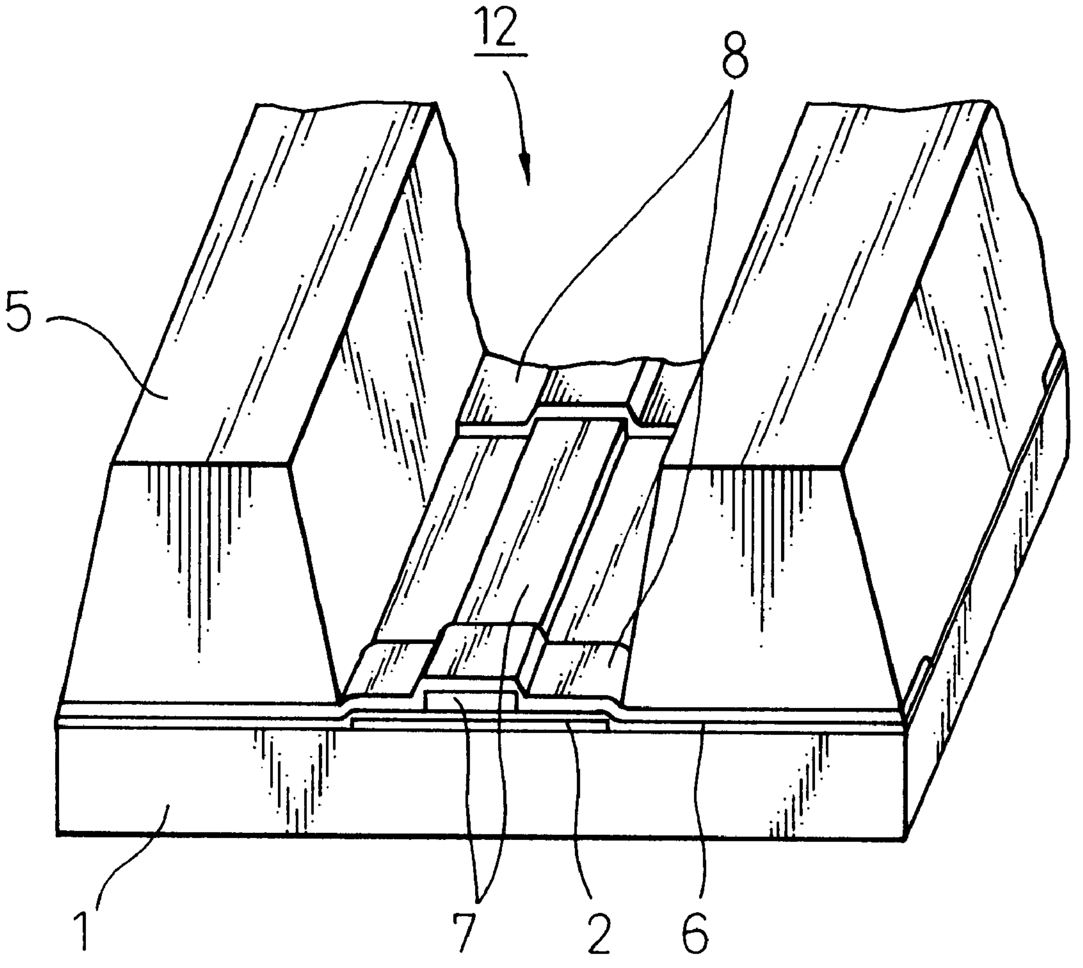
FIG. 14 is a perspective view showing another preferred embodiment of the ink chamber member provided with ink chambers formed according to the present invention.

For example, an ink chamber member in a bubble-jet ink jet head as shown in FIG. 14 may be produced as follows. A base wall member 2 is first formed in a predetermined striped pattern on the surface of a base plate member 1 constituted by a transparent substrate, and a heat-resistant insulating layer 6 is coated on the whole area of the base plate member with the base wall member formed thereon. Materials, for the insulating layer, usable herein include insulating materials commonly used in the field of semiconductor devices, for example, SiN and $SiO_2$. The insulating layer may be formed from the above material by a conventional method such as sputtering or vapor deposition. Although the thickness of the insulating layer 6 is not particularly limited, it is generally about 0.05 to 1 μm.

After the formation of the insulating layer 6, a heating element 7 is coated in a stripe form and preferably in a smaller width than that of the base wall member 2. Materials for the heating element usable herein include, for example, $Ta_2N$, $TaN_x$, and nichrome-based materials. The above material for the heating element is coated on the whole surface of the insulating layer 6, and the coating is selectively removed by etching or the like. Thus, a heating element 7 having a pattern as shown in the drawing is obtained. Although the thickness of the heating element 7 is not particularly limited, it is generally about 0.05 to 1 μm.

Subsequently, an electrode 8 for allowing a current to flow into the heating element 7 is formed. In the embodiment shown in the drawing, the electrode 8 is formed across both ends of the heating element 7. The material for the electrode used herein is not particularly limited so far as it has suitable electrical conductivity. Examples of materials for the electrode usable herein include $SnO_2$ and $In_2O_3$. The above material for the electrode is coated on the whole surface of the insulating layer, for example, by sputtering, vapor deposition or the like, to form a coating which is then selectively removed by etching or the like. Thus, a patterned electrode 8 as shown in the drawing is formed. Although the thickness of the electrode 8 is not particularly limited, it is generally about 0.05 to 1 μm.

After the formation of the heating element 7 and the electrode 8, the partitioning member 5 is formed by the above-described method. Thus, an ink chamber member suitable particularly for a bubble jet system is obtained. Subsequently, a flat plate (not shown) is put on the top of the ink chamber 12 to cover the opening. In this way, a desired bubble-jet ink jet head can be obtained. When a nozzle plate is put, instead of the flat plate, on the ink chamber, ink can be ejected perpendicularly to the heating element.

EXAMPLES

Representative examples of the present invention will be described with reference to the accompanying drawings. It should be understood that the present invention is not limited to these examples only.

Example 1

Formation of ink chamber member:

As shown in FIG. 10(A), a 400 $\mu$m-thick transparent glass substrate 1 was provided. This glass substrate is one to be used as a base plate member in a contemplated ink chamber member and is transparent to an ultraviolet radiation so that the ultraviolet radiation for exposure can be passed therethrough in the formation of the partitioning member.

As shown in FIG. 10(B), a thin layer 2 of chromium having a thickness of 0.15 $\mu$m and a width of 30 $\mu$m was applied in a stripe form on the substrate 1 in its predetermined sites. This thin layer 2 of chromium is one to be used as a base wall member of an ink chamber. Specifically, it was formed through steps shown in order in FIGS. 11(A) to (D).

Figure 11:
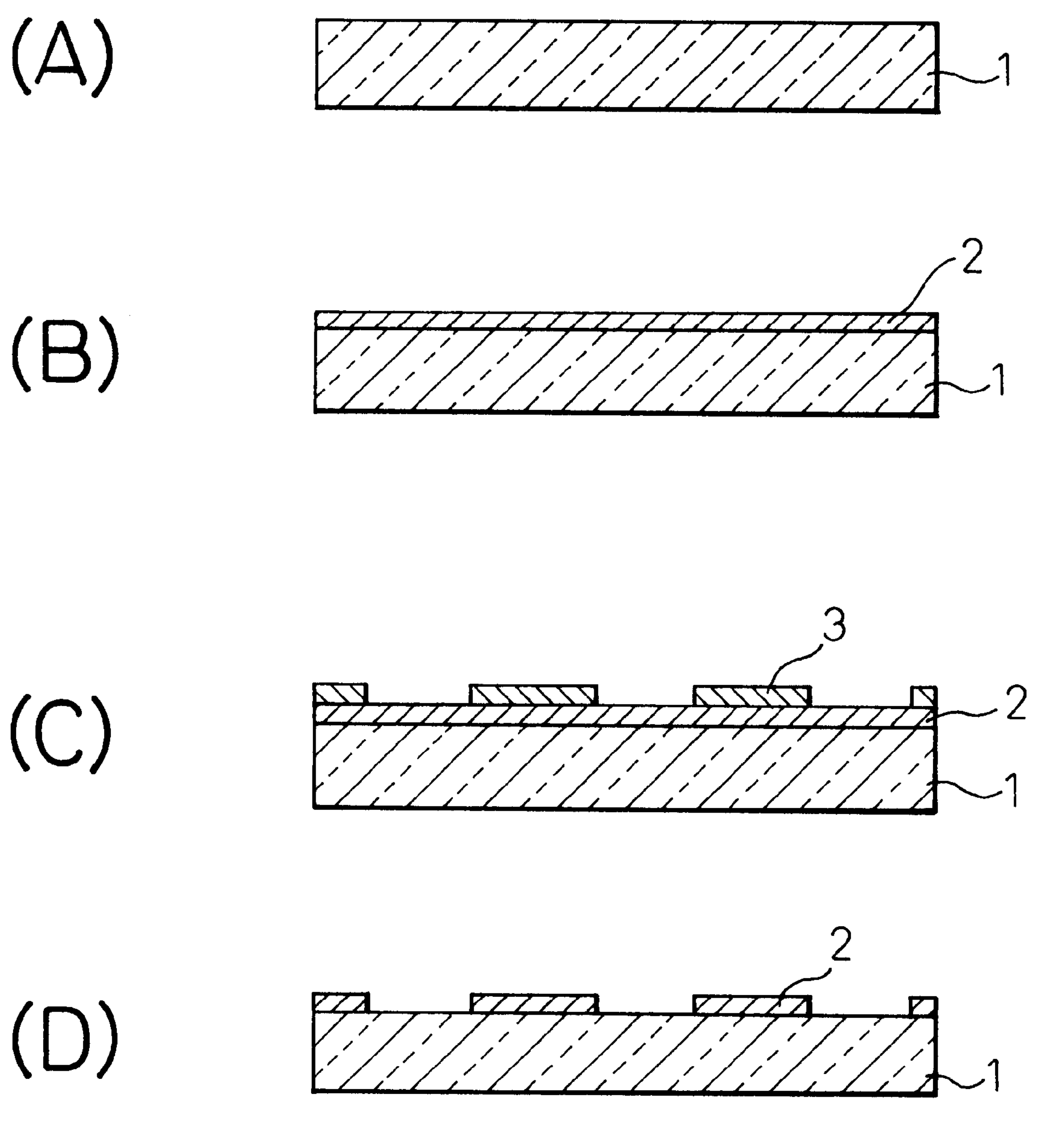
FIGS. 11(A) to (D) are cross-sectional views showing, in order of steps, a method which can be advantageously used in the formation of the base wall member in FIG. 10(B)

As shown in FIG. 11(B), a 0.15 $\mu$m-thick thin layer 2 of chromium was applied onto the whole surface of the transparent glass substrate 1 shown in FIG. 11(A). The thin layer 2 of chromium was formed by using a sputtering apparatus manufactured by TOKKI Co., Ltd. under conditions of an RF power of 450 W. an argon (Ar) gas pressure of 0.01 Torr and a sputtering time of 5 min.

A positive-working resist for a thin layer, AZ4620 (tradename) manufactured by Hoechst, was then spin-coated onto the thin layer 2 of chromium at 4000 rpm for 30 sec. Thus, a 6 $\mu$m-thick even film of AZ resist was formed. The resist layer was then prebaked by heating in an electric oven at 90° C. for 20 min. Thereafter, exposure was carried out using a mask having a predetermined pattern, and the exposed resist layer was developed to form a resist pattern. Thus, as shown in FIG. 11(C), a resist pattern 3 was formed on the thin layer 2 of chromium.

The patterning of the resist layer will be further described. The exposure was carried out using an ultraviolet exposing apparatus manufactured by Union Optical Co. Ltd. at an exposure of 100 mJ/cm$^2$. The mask used is commonly used in the production of LSI devices and comprised a glass substrate having thereon a chromium layer pattern. This mask had a flat pattern for ink chambers in an ink chamber member and, in order to provide a spacing between ink chambers of 71 $\mu$m, the pattern was 30 $\mu$m wide across the line section (chromium layer portion; impermeable to light) and 41 $\mu$m wide across the space section (opening portion; permeable to light). The spacing between ink chambers of 71 $\mu$m means that 360 ink chambers can be disposed per inch. In other words, printing at a high density of 360 dpi is possible. In the development of the exposed resist layer, a special developing solution for the resist, AZ4620, was used. The developing time was about one min. After the development, the resultant resist pattern was rinsed in pure water to wash away the residual developing solution and post-baked by heating in an electric oven at 120° C. for 20 min. Thus, a cured resist pattern was prepared.

After the formation of a resist pattern 3 as shown in FIG. 11(C), the underlying thin layer 2 of chromium was patterned by wet etching. In this example, since the material to be etched is a thin layer of chromium, an etching solution for chromium, that is, pure water: ammonium cerium nitrate: 60% perchloric acid=800 ml: 16 g: 16 ml, was used. The etching resulted in the transfer of the resist pattern 3 to the thin layer 2 of chromium. Thus, as shown in FIG. 11(D), a chromium pattern 2 to be used as a base wall member in the ink chamber member was prepared. The dimensional error between the resist pattern 3 and the chromium pattern 2 was very small and in the order of submicrons.

Figure 10:
FIGS. 10(A) to (E) are cross-sectional views showing, in order of steps, the formation of ink chambers according to the present invention.
Figure 10:
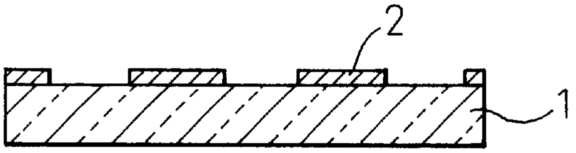
Figure 10:
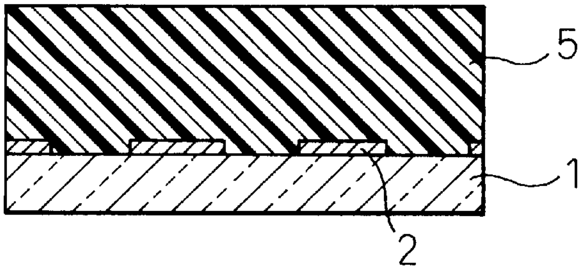
Figure 10:
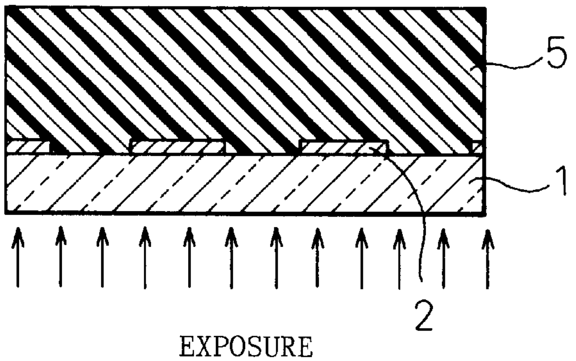
Figure 10:
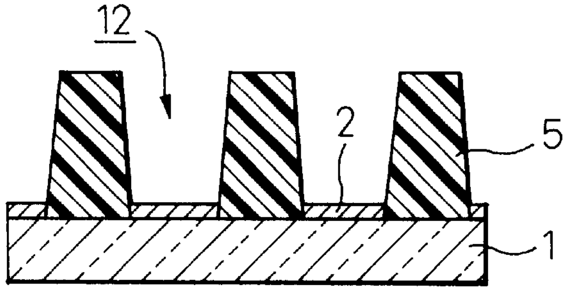

After the formation of the chromium pattern, as shown in FIG. 10 (C), a thick resist layer 5 was coated on the whole surface of the transparent substrate 1 in its chromium pattern 2 side. The resist used in this step was an ultraviolet-sensitive, negative-working, thick layer resist (THB-30 (tradename), manufactured by Japan Synthetic Rubber Co., Ltd.). This resist was spin-coated on the substrate at 1000 rpm for 10 sec. Thus, an about 50 $\mu$m-thick resist layer was prepared. After the spin coating, the coated substrate was heated on a hot plate of 100° C. for 5 min. The post-baking permitted the solvent contained in the resist layer to be evaporated, thereby completing the thermosetting. In the above process, however, only an about 50 $\mu$m-thick resist layer could be prepared, and in this case, the ink chamber having a high aspect ratio contemplated in the present example could not be formed. Therefore, in this example, the above process for forming the resist layer was repeated once more. The double coating provided a thick resist layer (thickness=about 100 $\mu$m).

The thick resist layer was then patterned to prepare a partitioning member. In this case, at the outset, as shown in FIG. 10(D), the resist layer 5 formed on the transparent substrate 1 was irradiated with an ultraviolet radiation through the transparent substrate on its side remote from the resist layer 5 (as indicated by an arrow). The exposure of the resist layer was performed using an ultraviolet exposure apparatus manufactured by Union Optical Co. Ltd. at 300 mJ/cm$^2$. Although the applied ultraviolet radiation was passed through the substrate 1, the chromium pattern 2 hindered the passage of the ultraviolet light and reflected or absorbed the light. The ultraviolet radiation in its portion, which had been passed through the substrate 1 and advanced without being hindered by the chromium pattern 2, entered the resist layer 5. Specifically, the chromium pattern 2 functioned as a mask in the ultraviolet light exposure process. As a result, the resist layer 5 was exposed in a desired pattern, that is, subjected to pattern exposure in a contemplated plane pattern for the ink chamber. Thus, the exposed areas of the resist layer 5 were rendered insoluble in a developing solution in the subsequent step of development.

After the pattern exposure of the resist layer, the exposed resist layer was subjected to dip development using a specialty developing solution for THB-30 under conditions of a developing solution temperature of 35° C. and a development time of 3 min. As a result of the development, the resist layer in only its unexposed areas, which had not been rendered insoluble in a developing solution in the above step of exposure, were dissolved and removed. Thus, a resist pattern 5 as shown in FIG. 10(E) was prepared. In the drawing, the transparent substrate 1 corresponds to the base plate member of the ink chamber member, the chromium pattern 2 corresponds to the base wall member, and the resist pattern 5 corresponds to the partitioning member. A space surrounded by these three members is an ink chamber 12.

FIG. 8 is a perspective view of the principal part of the ink chamber member, thus prepared, enlarged with respect to the dimensions of each member for easy understanding of the form. In the ink chamber member 11 shown in the drawing, a 0.15 $\mu$m-thick chromium base wall member 2, which has been patterned in a plane form of the ink chamber, and a 100 μm-thick resist partitioning member 5 are provided on the base plate member 1 having a thickness of 400 μm. The width of the ink chamber 12 was 30 μm at the bottom (at the boundary of the base plate member 1) of the ink chamber, and the width of the partitioning member 5, which divides the ink chamber 12 into a plurality of chambers, was 41 μm at the bottom. This could bring the ink chamber width:ink chamber height ratio to 1:3 or more. In the ink chamber member 11 prepared in the present example, a plurality of ink chambers 12 (in the drawing, only four chambers are illustrated for simplification) are combined in the rear thereof to form one chamber communicating with an ink feed port 12*a*.

Regarding the sectional form of the partitioning member 5 of the ink chamber member 11, the larger the distance from the base plate member 1, the smaller the width of the partitioning member 5 constituting the ink chamber 12 (i.e., the ink chamber 12 widens with an increase in the distance from the member 1). That is, the sectional form is a forward tapered one. The angle of inclination of the partitioning member 5 was measured and found to be about 6°. The formation of the partitioning member 5 in such a sectional form by patterning is one of the most characteristic features of the method for forming an ink chamber according to the present invention.

Example 2

Formation of ink chamber member:

The procedure of Example 1 was repeated, except that, for the formation of the partitioning member, triple coating of an identical resist, for a thick layer, was carried out under identical coating conditions to form a 150 μm-thick layer. Further, in this example, since the thickness of the resist layer was increased, the exposure in the pattern exposure was increased to 450 $mJ/cm^2$. Thus, an ink chamber member was prepared wherein the aspect ratio of the ink chamber was as high as 1:5 in terms of the ink chamber width:ink chamber height ratio.

The principal cross-sectional part of the resultant ink chamber member is shown in FIG. 7. An ink chamber 12 defined by a base wall member 2 and a partitioning member 5 had a width of 30 μm and a height of 150 μm. As is apparent from these results, in this example, an ink chamber having a high aspect ratio of 1:5 could be formed. As with Example 1, the partitioning member 5 of the ink chamber member had a width of 41 μm in its portion in contact with the base plate member 1 and an angle of inclination of about 6°. Thus, an ink chamber member could be formed wherein ink chambers having a height of 150 μm are disposed in 360 dpi (intervals of ink chambers: 71 μm).

Example 3

Formation of electrocast ink chamber member:

The procedure of Example 1 was repeated, except that, in order to use the formed ink chamber member as an electrocasting mold for the formation of an electrocast ink chamber member, the position of the ink chamber and the position of the partitioning member (formed of a resist for a thick layer) for separating adjacent ink chambers from each other were reversed. Specifically, the pattern of the mask used in the formation of the chromium pattern as the base wall member was reversed. As a result, the ink chamber member had a pattern opposite to the pattern in the ink chamber member formed in Example 1. That is, the portion of the ink chamber in Example 1 was a partitioning member in this example, while the portion of the partitioning member in Example 1 was an ink chamber in this example. The section of the resultant ink chamber member (electrocasting mold) is shown in FIG. 12(A). In this drawing, for simplification, only a base plate member 1 and a partitioning member 5 are shown, and the base wall member is omitted.

Figure 12:
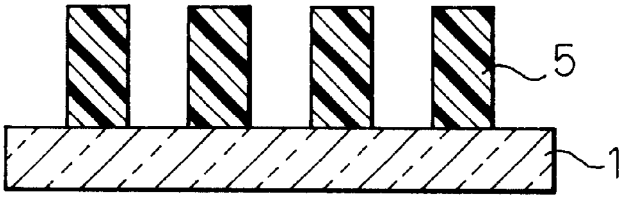
FIGS. 12(A) to (D) are cross-sectional views showing, in order of steps, a process for forming a metallic ink chamber member by electrocasting using an ink chamber member, formed according to the present invention, as an electrocasting mold.
Figure 12:
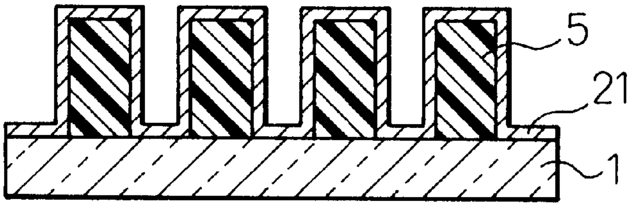
Figure 12:
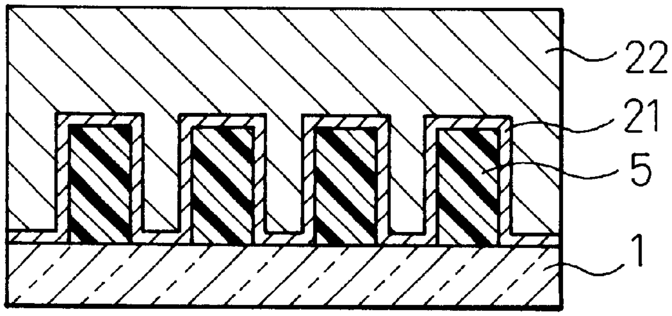
Figure 12:
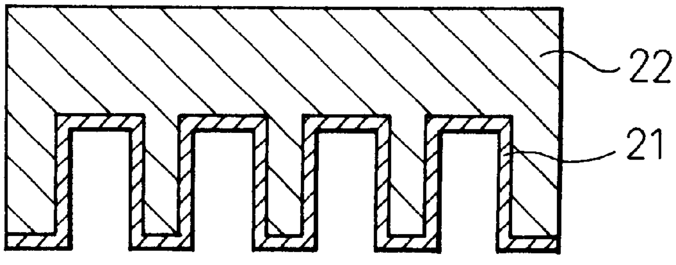

Next, for electrocasting, as shown in FIG. 12 (B), an electrode film 21 for electrocasting was formed on the surface of the formed ink chamber member. A 0.05 μm-thick chromium layer was first vapor-deposited followed by vapor deposition of a 0.2 μm-thick gold (Au) layer. The purpose of providing chromium layer which had been first formed was to enhance the adhesion of the gold layer to the substrate.

Nickel was then grown on the gold layer to a thickness of about 0.3 mm by electrocasting extensively adopted in the art. For the formation of this nickel layer, a processing bath having the following composition was used:

| | |
|---|---|
| Water | 5 L |
| Nickel sulfamate | 1650 g |
| Nickel chloride | 150 g |
| Boric acid | 225 g |
| Sodium lauryl sulfate | 5 g |

The temperature of the processing bath was 60° C.±1° C., the current density was 50 $mA/cm^2$, and the stirring rate of the bath was 1 L/min. As shown in FIG. 12(C), an electrocast member 22 of nickel was formed by this electrocasting.

After the electrocasting of nickel, the whole assembly shown in FIG. 12(C) was dipped in an ultrasonically vibrated special release solution for a thick layer resist. As a result, the partitioning member 5 was separated from the electrocast member 22 and further dissolved in the release solution and removed. The dissolution of the partitioning member 5 resulted in separation of the base plate substrate 1, which had supported the partitioning member 5, from the electrocast member 22. As a result, as shown in FIG. 12(D), an electrocast ink chamber member comprising the electrocast member 22 and an electrode layer 21 coated on the surface thereof was provided. As is apparent from comparison with the electrocasting mold shown in FIG. 12 (A), the electrocast ink chamber member thus obtained had a pattern opposite to the pattern in the original mold. Therefore, the concave portion of the electrocast ink chamber member can be used as the ink chamber.

Example 4

Formation of ink jet head in bubble jet system

A chromium pattern in a stripe form having a width of 30 μm and a layer thickness of 0.15 μm was formed on a 400 μm-thick transparent glass substrate in the same manner as in Example 1.

Next, a 0.2 μm-thick insulating layer of silicon oxide ($SiO_2$) was formed on the substrate having thereon the chromium pattern. For the formation of a silicon oxide layer, a thin silicon layer was first grown and then thermally oxidized. Further, a 0.1 μm-thick heating element of tantalum (TaN) was formed on the chromium pattern through the insulating layer prepared above, and it was subjected to patterning to obtain a pattern width of 20 μm which is smaller than the chromium pattern width. An electrode, of a conductive material ($SnO_2$), having a width of 20 μm and a layer thickness of 0.2 μm was formed on the heating element in a stripe form so as to cross both end sections thereof. $SnO_2$ used herein as an electrode material is transparent and, hence, in the subsequent exposure for the formation of the partitioning member, does not hinder the light which enters the resist through the substrate.

Figure 13:
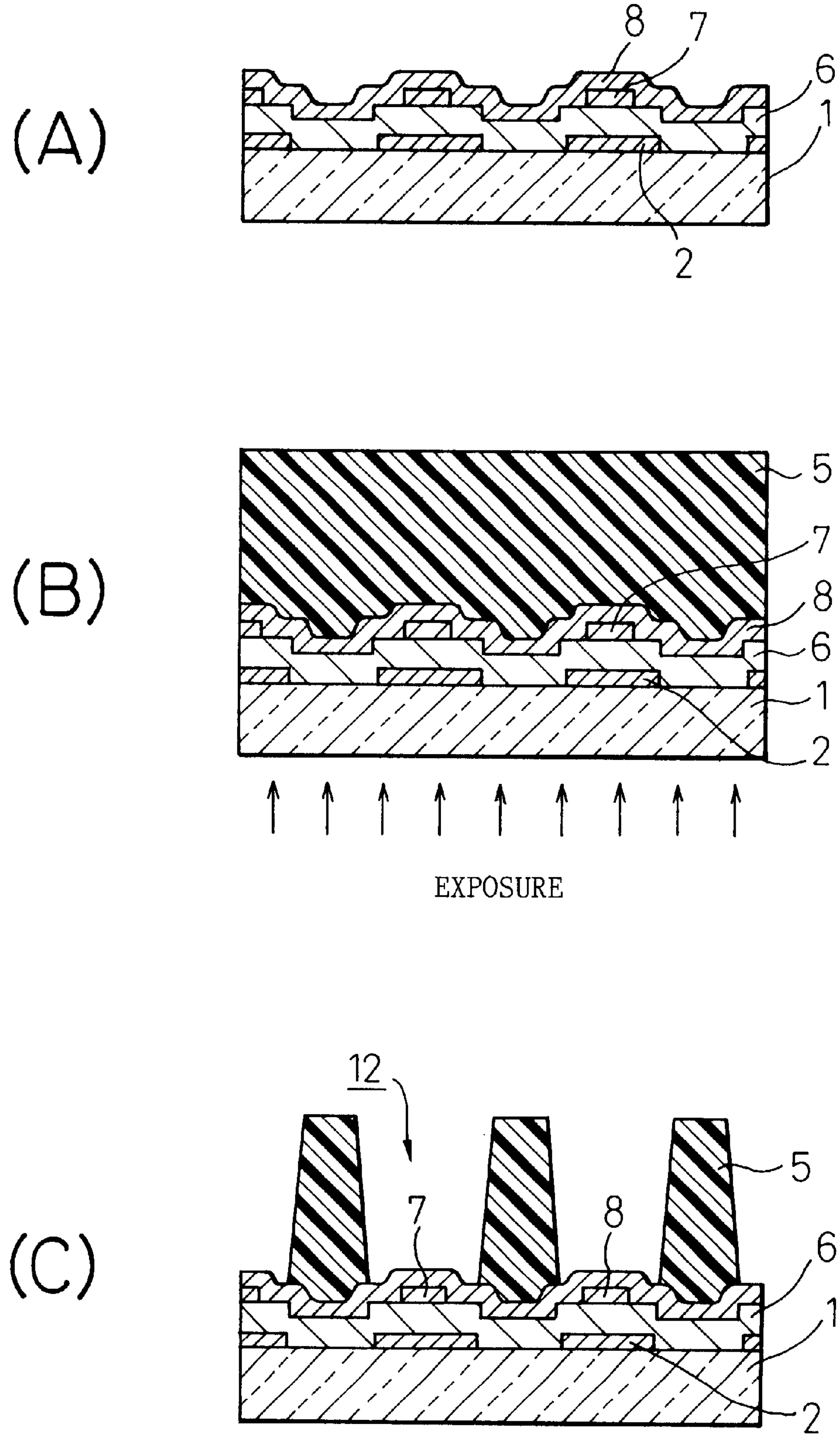
FIGS. 13(A) to (C) are cross-sectional views showing, in order of steps, the formation of an ink chamber member shown in FIG. 14.

A laminate structure as shown in FIG. 13(A) was provided through the above series of treatments. Specifically, the laminate structure comprises: a transparent substrate 1; and, stacked thereon in the following order, a chromium pattern 2 in a stripe form, an $SiO_2$ insulating layer 6 coated on the whole surface of the substrate having the chromium pattern 2, a TaN heating element 7 in a stripe form having a somewhat smaller width than the chromium pattern 2, and an $SnO_2$ electrode 8 formed so as to cross both end sections of the heating element 7. The combination of the heating element 7 and the electrode 8 thus formed constitutes pressurizing means in the ink jet head in a bubble jet system to be prepared in the present example.

After the formation of the pressurizing means, a partitioning member was formed in the same manner as in Example 1. At the outset, as shown in FIG. 13(B), a thick layer resist was coated on the whole surface of the transparent substrate 1 in the heating element 7/electrode 8 side, and ultraviolet radiation was applied to the resist layer 5, formed on the substrate 1, from the backside of the substrate 1 (see an arrow).

After the pattern exposure of the resist layer, the exposed resist layer was subjected to dip development. As a result of the development, the resist layer in only its unexposed areas was dissolved and removed. Thus, a resist pattern 5 as shown in FIG. 13(C) was provided. FIG. 14 is a perspective view of the principal part of the ink chamber member, thus prepared, enlarged with respect to the dimension of each member for easy understanding of the form. In the drawing, a transparent substrate 1 corresponds to the base plate member in the ink chamber member of the present invention, a chromium pattern 2 and an insulating layer 6 provided thereon correspond to the base wall member, and the resist pattern 5 corresponds to the partitioning member. A space surrounded by these three members is an ink chamber 12. The ink chamber 12 is completely closed by covering the top of the ink chamber 12 with a flat plate (not shown), making it possible to use the ink chamber 12 in the head section. Alternatively, a nozzle plate may be used instead of the flat plate. In this case, in the resultant ink jet head, an ink can be ejected in a direction perpendicular to the heating element.

Example 5

Formation of ink chamber member:

The procedure of Example 1 was repeated, except that quadruple coating of a thick layer resist was carried out to form a resist pattern having a layer thickness of 200 μm. In order to avoid a light diffraction problem, in the base of a resist pattern created in the case of such a thick layer, an intermediate layer covered the whole surface of the transparent substrate after the step of forming the chromium pattern and before the step of forming a resist pattern thereon.

Figure 16:
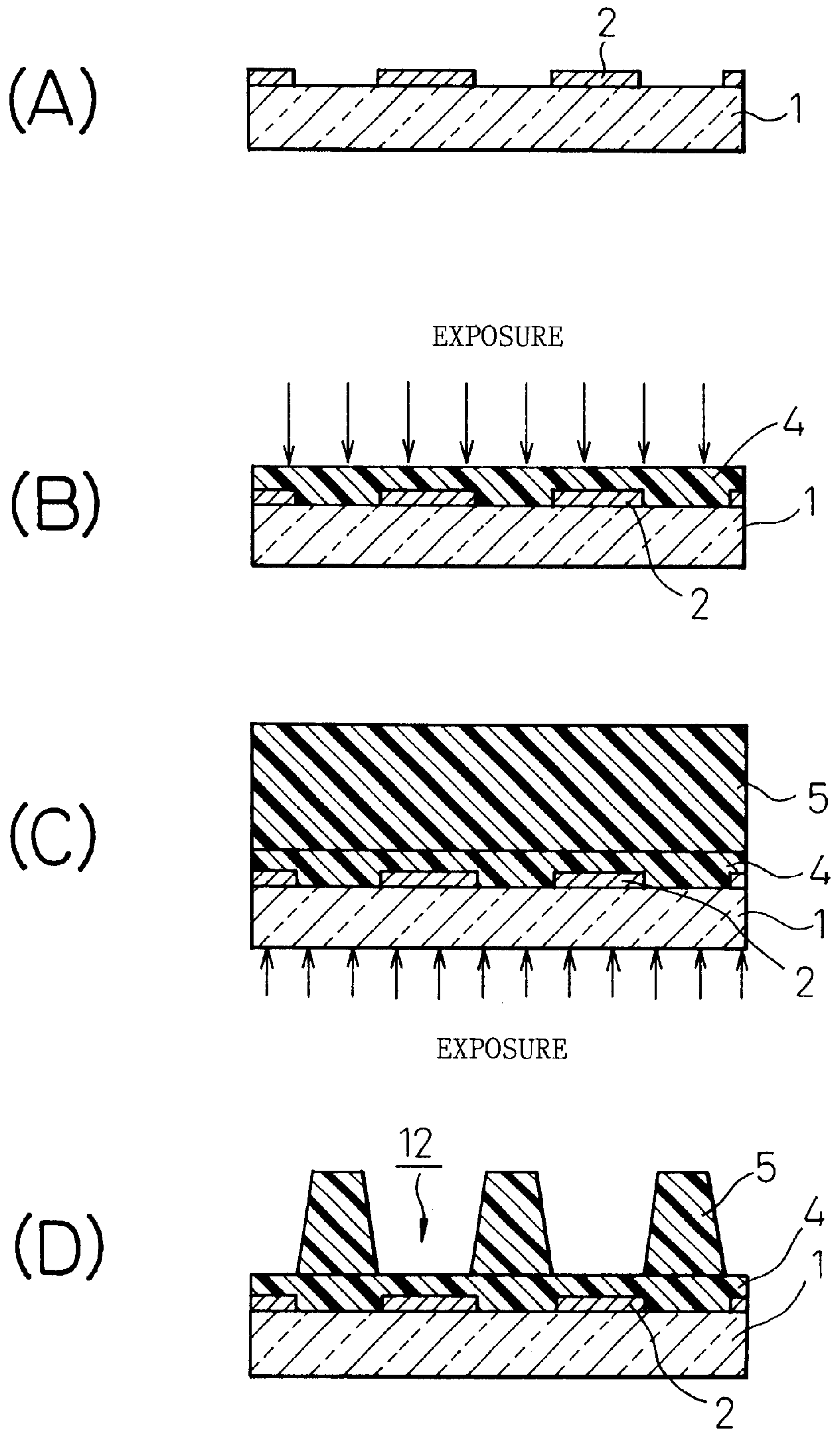
FIGS. 16(A) to (D) are cross-sectional views showing, in order of steps, the process for forming an ink chamber member according to the present invention which can eliminate the diffraction of light shown in FIG. 15.

At the outset, as shown in FIG. 16(A), a thin chromium layer 2 in a stripe form having a layer thickness of 0.15 μm and a width of 30 μm was applied onto a 400 μm-thick transparent glass substrate 1.

Next, for the formation of an intermediate layer, a 20 μm-thick thick layer resist was spin-coated onto the transparent substrate having the chromium pattern. The thick layer resist used herein, as with the thick layer resist used in the subsequent formation of the partitioning member, was an ultraviolet-sensitive, negative-working resist for a thick layer (THB-30 (tradename), manufactured by Japan Synthetic Rubber Co., Ltd.). The spin-coating was carried out under conditions of a revolution speed of 2000 rpm and a coating time of 10 sec. As shown in FIG. 16(B), an intermediate layer 4 was formed on the whole surface of the transparent substrate 1. Whole image exposure to ultraviolet radiation was carried out as indicated by an arrow in FIG. 16(B) to cure the intermediate layer 4. The apparatus used in this exposure of the intermediate layer was an ultraviolet light exposure apparatus manufactured by Union Optical Co. Ltd. The exposure was on a high level of 1200 $mj/cm^2$ from the viewpoint of avoiding the occurrence of an undesired reaction of the intermediate layer in the later step.

After the formation of the intermediate layer, in the same manner as in Example 1, a resist for a thick layer, THB-30, was coated on the substrate followed by patterning.

At the outset, as shown in FIG. 16(C), a resist for a thick layer was coated on the whole surface of the transparent substrate 1 on its intermediate layer 4 side. In this resist coating step, spin coating at 1000 rpm for 10 sec (layer thickness about 50 μm) followed by prebaking at 100° C. for 5 min was repeated four times. As a result of the quadruple coating, a resist layer 5 for a thick layer (thickness=about 200 μm) was provided.

In order to prepare a partitioning member, the thick layer resist was then patterned. As shown in FIG. 16(C), ultraviolet radiation was applied to the resist layer 5 formed on the transparent substrate 1 from the backside of the substrate 1 (see an arrow). The ultraviolet irradiation was carried out in the same manner as in Example 1, except that the exposure was changed to 1200 $mJ/cm^2$ in order to cope with the increased thickness of the resist layer 5.

After the pattern exposure of the resist layer, the exposed resist layer was subjected to dip development in the same manner as in Example 1, except that, although the temperature of the developing solution was unchanged and 35° C., the development time was prolonged to 6 min. As a result of the development, the resist layer in its unexposed area alone was dissolved and removed. Thus, a resist pattern 5 as shown in FIG. 16(D) was provided. In this resist pattern, although the height was as large as 200 μm (in the drawing, the pattern is shown in a small height for convenience of the preparation of the drawing), a "cut-in" defect found in the base in the conventional resist pattern could be avoided. In the drawing, the transparent substrate 1 corresponds to the base plate member in the ink chamber member of the present invention, the chromium pattern 2 and the intermediate layer 4 covering the chromium pattern 2 correspond to the base wall member, and the resist pattern 5 corresponds to the partitioning member. A space surrounded by these three members is an ink chamber 12.

Industrial Applicability

As can be understood from the foregoing description, according to the present invention, the width of the ink chamber can be decreased, realizing high density recording which has been strongly desired in the art. In addition, according to the present invention, the aspect ratio defined as the ink chamber width:ink chamber height ratio can be brought to a large value. Therefore, as described above, even when the width of the ink chamber is small, the amount of the ink filled into the ink chamber is equal to or larger than that in the case of the conventional ink chamber. Consequently, every time printing is performed, ink in a satisfactory amount, to such an extent that the print quality is not deteriorated, can be ejected through an attached nozzle. Further, in the present invention, an ink chamber can be easily and accurately formed, and, in addition, deformation and other problems can be avoided, leading to good yield. Furthermore, the ink jet head according to the present invention is not limited to a piezoelectric system and can be advantageously applied to heads in various other systems.

What is claimed is:

1. A process for producing an ink jet head comprising a plurality of nozzles for ejecting ink, ink chambers communicating with the nozzles for passage and pressurization of the ink, and pressurizing means for creating a change in volume of the ink in the respective ink chambers to eject the ink through the nozzles, the process comprising the steps of:

providing a transparent substrate having predetermined form and dimension to form a base plate member having front and back sides;

forming a pattern of a base wall members made of a light-impermeable material on the front side of the base plate member, the pattern of the base wall members being formed by the sub-steps of:

coating a base wall member-forming material on the whole of the front side of the base plate member;

coating a photosensitive material on the whole area of the base wall member-forming material coating;

selectively removing the photosensitive material coating according to a desired base wall member pattern by photolithography; and using the photosensitive material pattern as a mask to selectively remove the underlying base wall member-forming material coating;

coating a partitioning-member-forming photosensitive material in a predetermined thickness on the whole of the front side of the base plate member;

selectively exposing the photosensitive material coating through the base wall member pattern to light to which the photosensitive material is sensitive by directing such light through the back side of the base plate member, thereby rendering exposed areas of the photosensitive material coating insoluble in a developing solution; and developing the exposed photosensitive material coating to remove unexposed areas of the photosensitive material coating, thereby forming partitioning members above the base plate member in areas not occupied by the base wall members, and thus producing ink chambers between the partitioning members, each of the ink chambers comprising the base wall member provided above the base plate member in a pattern conforming to the form of the ink chambers.

2. The process according to claim 1, further comprising, after the step of forming a base wall member pattern and before the step of coating a partitioning member-forming photosensitive material thereon, the step of forming a transparent intermediate layer having a thickness larger than that of the base wall member pattern.

3. A process for producing an ink jet head comprising a plurality of nozzles for ejecting ink, ink chambers communicating with the nozzles for passage and pressurization of the ink, and pressurizing means for creating a change in volume of the ink in the respective ink chambers to eject the ink through the nozzles, the process comprising the steps of:

providing a transparent substrate having predetermined form and dimension to form a base plate member having front and back sides;

forming a pattern of a light-impermeable material on the front side of the base plate member to provide base wall members;

coating a partitioning member-forming photosensitive material in a predetermined thickness on the whole of the front side of the base plate member;

selectively exposing the photosensitive material coating through the base wall member pattern to light to which the photosensitive material is sensitive by directing such light through the back side of the base plate member, thereby rendering exposed areas of the photosensitive material coating insoluble in a developing solution; and developing the exposed photosensitive material coating to remove unexposed areas of the photosensitive material coating, thereby forming partitioning members above the base plate member in areas not occupied by the base wall members, and thus producing ink chambers between the partitioning members, each of the ink chambers comprising the base wall member provided above the base plate member in a pattern conforming to the form of the ink chambers, and wherein an ink flow passage in each of the ink chambers, as viewed in a section perpendicular to the base plate member and to the partitioning members, is formed to have a generally rectangular shape longer in a direction perpendicular to the base plate member than in a direction perpendicular to the partitioning members, the ink chambers each having a height of at least 50 $\mu$m and an aspect ratio, defined as a ratio of ink chamber width to ink chamber height, of 1:3 or more.

4. The process according to any one of claims 1 to 3, which further comprises the step of using the partitioning walls as a mold for electrocasting to form ink chambers of a metallic material by subsequent electrocasting.

* * * * *